US 6,736,450 B2

(12) United States Patent
Miyagi

(10) Patent No.: US 6,736,450 B2
(45) Date of Patent: May 18, 2004

(54) COLLAPSIBLE CHAIR

(75) Inventor: Kaoru Miyagi, Tokyo (JP)

(73) Assignee: Satsuki Co., Ltd., Tokyo (JP)

( * ) Notice: Subject to any disclaimer, the term of this patent is extended or adjusted under 35 U.S.C. 154(b) by 0 days.

(21) Appl. No.: 10/270,306

(22) Filed: Oct. 15, 2002

(65) Prior Publication Data
US 2003/0071493 A1 Apr. 17, 2003

(30) Foreign Application Priority Data

Oct. 16, 2001 (JP) ........................................ 2001/318751
Dec. 21, 2001 (JP) ........................................ 2001/389466

(51) Int. Cl.$^7$ ................................................ A47C 4/28
(52) U.S. Cl. ........................ 297/16.2; 297/39; 297/42; 297/45; 297/59
(58) Field of Search .......................... 297/16.2, 39, 40, 297/41, 42, 45, 46, 47, 59

(56) References Cited

U.S. PATENT DOCUMENTS

| 4,030,769 A | * | 6/1977 | Peng et al. ................. 297/45 X |
| 4,564,212 A | * | 1/1986 | Orlandino et al. ........ 297/56 X |
| 4,565,388 A | * | 1/1986 | Kassa ....................... 297/45 X |
| 4,836,573 A | * | 6/1989 | Gebhard ................... 280/644 |
| 5,203,577 A | * | 4/1993 | Kato et al. .............. 297/130 X |
| 5,205,579 A | * | 4/1993 | Kato et al. .............. 297/376 X |
| 6,082,813 A | * | 7/2000 | Chen ........................ 297/16.2 |
| 6,247,750 B1 | * | 6/2001 | Tsai ......................... 297/16.2 |
| 6,454,348 B1 | * | 9/2002 | Wu .......................... 297/16.2 |
| 6,575,534 B2 | * | 6/2003 | Chen ..................... 297/16.2 X |
| 6,601,912 B1 | * | 8/2003 | Chen ........................ 297/45 |
| 2003/0015892 A1 | * | 1/2003 | Wu ........................... 297/45 |
| 2003/0030305 A1 | * | 2/2003 | Choi ........................ 297/16.2 |

\* cited by examiner

Primary Examiner—Peter M. Cuomo
Assistant Examiner—Rodney B. White
(74) Attorney, Agent, or Firm—Wenderoth, Lind & Ponack, L.L.P.

(57) ABSTRACT

A collapsible chair includes a frame composed of four pairs of cross legs located on four sides of the chair, namely, front, back and side cross legs. The cross legs are connected at their upper and lower ends with connector blocks and feet, respectively and collapsible in a scissors-like manner. A pair of vertical back legs are located at opposite sides of the back cross legs. A pair of arm rests have front ends pivotably connected to the side cross legs and rear ends pivotably and slidably supported by an arm rest support assembly. In one embodiment, the arm rest support assembly includes a pair of vertical support rods connected to the vertical back legs, and a pair of sleeves pivotably connected to the support rods and adapted to slidably receive the arm rests.

38 Claims, 22 Drawing Sheets

COLLAPSIBLE CHAIR

BACKGROUND OF THE INVENTION

The present invention generally relates to a folding article of the type in which its framework may be collapsed to provide a compact article for storage purposes. More particularly, the present invention relates to a collapsible chair and wheelchair.

It is well known that a collapsible chair is made of four pairs of cross legs located on four sides of the chair and pivotably connected intermediate their length, as disclosed, for example, by U.S. Pat. No. 3,136,272. In this patent, a pair of vertical back legs are located on the back side of the chair to support a flexible back rest. The vertical back legs and the cross legs are operatively associated with each other to support a flexible seat. A pair of arm rests are located on opposite sides of the collapsible chair. The arm rests are made of a flexible material so that the arm rests can readily be folded when the chair is collapsed in a scissors-like manner. Although the arm rests are preferably made of a rigid material, such rigid arm rests are difficult to manage when the chair is collapsed in two dimensions simultaneously.

It is, therefore, an object of the present invention to provide a collapsible chair and wheelchair which allow a pair of rigid arm rests to be moved from a horizontal operable position to a vertical storage position when the chair and wheelchair are collapsed in a scissors-like manner and also, returned to its horizontal operable position when the wheelchair is opened for use.

SUMMARY OF THE INVENTION

According to the present invention, there is provided a collapsible chair comprising a frame including a pair of front cross legs pivotally connected together intermediate their length, a pair of back cross legs pivotally connected together intermediate their length, two pairs of side cross legs pivotally connected together intermediate their length, a pair of vertical back legs located at opposite sides of the back cross legs, and means for interconnecting the front cross legs, the back cross legs, the side cross legs and the vertical back legs so as to move the collapsible chair between an expanded operable position and a collapsed position. The cross legs and the vertical back legs are collapsed in a scissors-like manner when the chair is folded up. A flexible seat is connected to the frame, and a back rest is connected between the vertical back legs. The seat and the back rest may be integrally formed from a single sheet. A pair of rigid arm rests are located on opposite sides of the collapsible chair. The arm rests may include a corresponding pair of elongated members having front and rear ends, and a corresponding pair of downwardly extending extensions having upper ends connected to the front ends of the elongated members and lower ends connected to the frame.

As a feature, means are provided to move the arm rests between a substantially horizontal operative position when the collapsible chair is held in its expanded operable position and a substantially vertical stored position when the collapsible chair is held in its collapsed position. The arm rests may be of a one-piece structure. In one embodiment, a pair of support rods are connected to and extend substantially parallel to the vertical back legs. A corresponding pair of sleeves are pivotally connected to the support rods and adapted to slidably receive the arm rests or the elongated members of the arm rests. This arrangement allows combined pivotably and slidable movement of the arm rests when the chair is moved between its expanded and collapsed positions and thus, enables the rigid arm rests to be smoothly moved between its horizontal operable and vertical stored positions. Alternatively, a pair of guide rods may be connected and extend substantially parallel to the vertical back legs, and a corresponding pair of slide blocks may be slidably mounted on the guide rods. The rear ends of the arm rests may be pivotably connected to the slide blocks. Still alternatively, a pair of support rods may be connected to and extend substantially parallel to the vertical back legs, and a corresponding pair of brackets may be pivotally connected to the support rods. A pair of rollers may be rotatably carried by the brackets and rollingly received within the arm rests or the elongated members of the arm rests.

Locking means may be provided to lock the arm rests against pivotal and sliding movement when the collapsible chair is held in its expanded operable and collapsed positions. In one embodiment, a pair of hooks are pivotably connected to the rear ends of the arm rests. A pair of upper locking pins are attached to the support rods, and a pair of lower locking pins are attached to the vertical back legs. The hooks are lockingly engageable with the upper locking pins to prevent inadvertent folding of the chair when the chair is held in its expanded operable position. Also, the hooks are lockingly engageable with the lower locking pins to prevent inadvertent unfolding of the chair when the chair is held in its collapsed position.

The collapsible chair may include four casters to provide a collapsible wheelchair. A front pair of casters and a rear pair of casters may be rotatably supported by the frame. The rear casters may include a pair of wheels, and a corresponding pair of pivotal levers operatively associated with the wheels to selectively stop the wheels. Preferably, the wheels have a corresponding pair of axles displaced rearwardly of the vertical back legs, and the levers may be positioned rearwardly of the axles. This arrangement facilitates operation of the levers.

Each of the front casters may include a pair of spaced wheels, and each of the rear casters may include a single wheel. This single wheel may be positioned between the two wheels of each of the front casters when the collapsible chair is folded to its collapsed position. This results in savings in space in which the wheelchair is stored.

The above and other objects, features and advantages of the present invention will be apparent from the following description of preferred embodiments when taken in conjunction with the accompanying drawings.

DETAILED DESCRIPTION OF THE INVENTION

Figure 1:
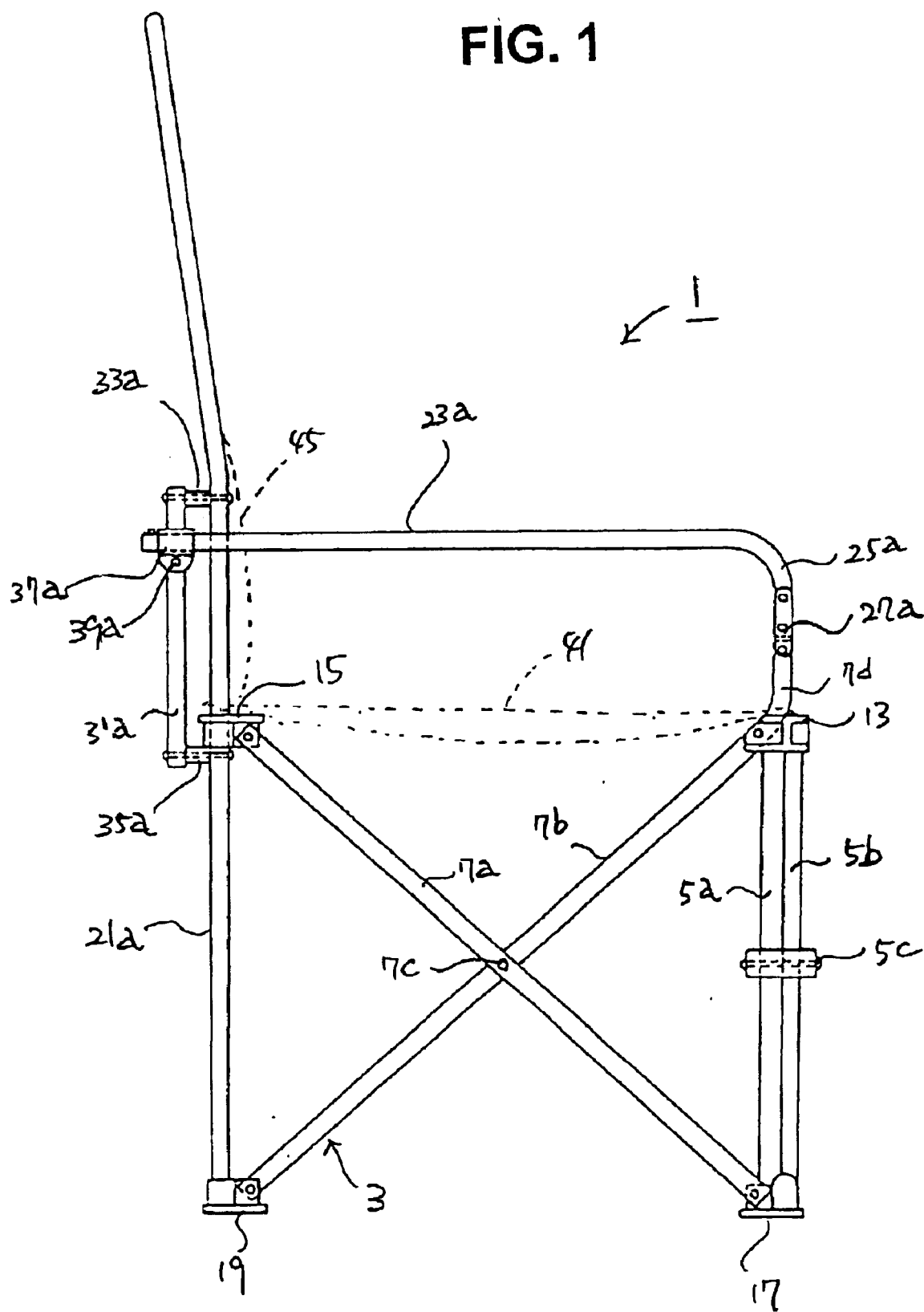
FIG. 1 is a side view of a collapsible chair according to one embodiment of the present invention.
Figure 3:
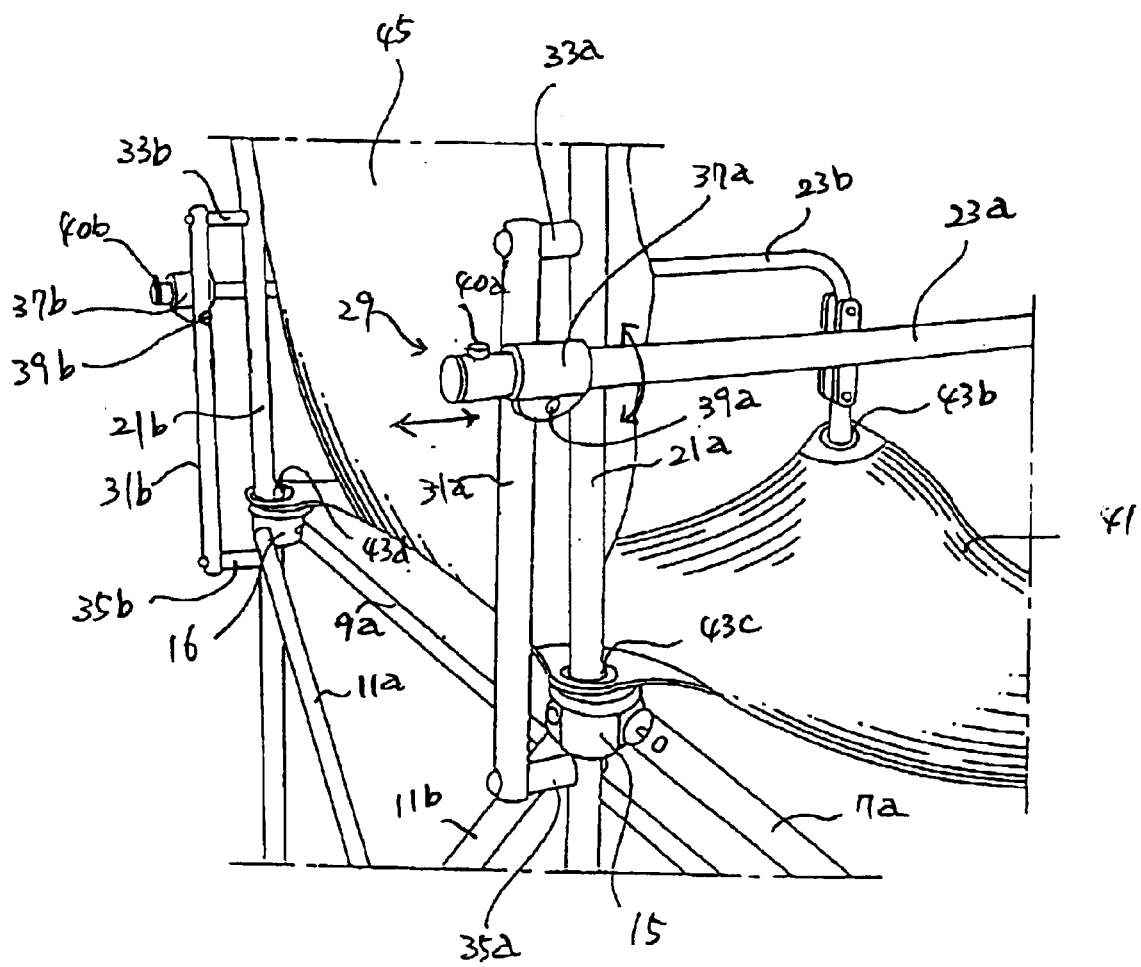
FIG. 3 is an enlarged rear perspective view, in part, of the collapsible chair to show an arm rest support assembly in detail.
Figure 4:
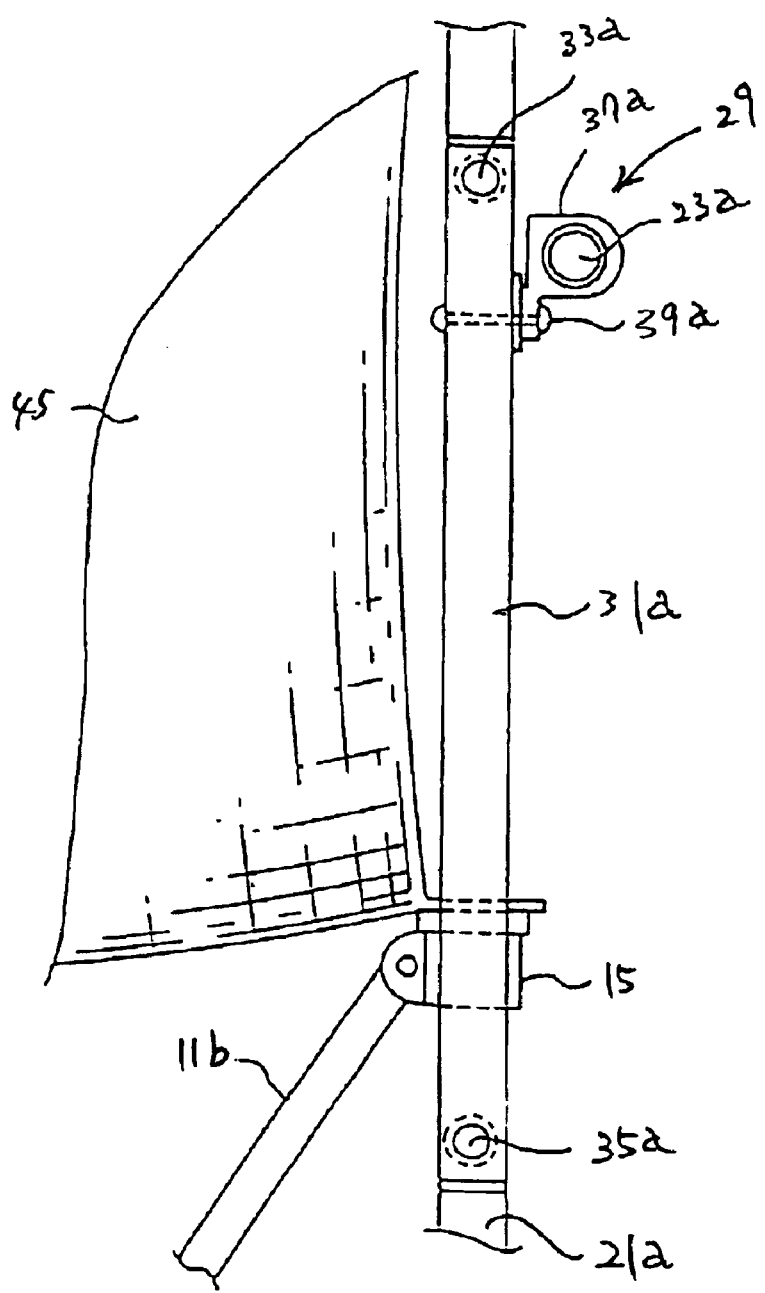
FIG. 4 is an enlarged rear view of the arm rest support assembly shown in FIG. 3.

Referring first to FIGS. 1 and 3, there is illustrated a collapsible chair assembled according to one embodiment of the present invention and generally designated by the reference numeral 1. The collapsible chair 1 includes a frame 3 made of metallic tubular members. Specifically, the frame 3 includes four pairs of cross legs located on four sides of the chair 1, namely, a front pair of cross legs 5a, 5b, a left-side pair of cross legs 7a, 7b, a right-side pair of cross legs 9a, 9b and a back pair of cross legs 11a, 11b. The front cross legs 5a, 5b are pivotally connected to one another intermediate their length by a pivot pin 5c. Similarly, the left-side cross legs 7a, 7b are pivotally connected to one another intermediate their length by a pivot pin 7c. The right-side cross legs 9a, 9b are pivotally connected to one another intermediate their length by a pivot pin 9c. The back cross legs 11a, 11b are pivotally connected to one another intermediate their length by a pivot pin 11c.

To connect the upper and lower ends of the cross legs, there are provided a set of four upper connector blocks 13 to 16, one at each upper corner of the chair 1, and a set of four lower connector feet 17 to 20, one at each lower corner of the chair 1. Specifically, one of the upper front connector blocks, as at 13, connects the upper end of the front cross leg 5b to the upper end of the left-side cross leg 7b. The other upper front connector block 14 connects the upper end of the front cross leg 5a to the upper end of the right-side cross leg 9b. Similarly, one of the upper back connector blocks, as at 15, connects the upper end of the left-side cross leg 7a to the upper end of the back cross leg 11b. The other upper back connector block 16 connects the upper end of the back cross leg 11a to the upper end of the right-side cross leg 9a. One of the lower front connector feet, as to 17, connects the lower end of the front cross leg 5a to the lower end of the left-side cross leg 7a. The other lower front connector foot 18 connects the lower end of the front cross leg 5b to the lower end of the right-side cross leg 9a. Similarly, one of the lower back connector feet, as at 19, connects the lower end of the left-side cross leg 7b to the lower end of the back cross leg 11a. The other lower back connector foot 20 connects the lower end of the back cross leg 11b to the lower end of the right-side cross leg 9b. All the connections are pivot connections.

Figure 2:
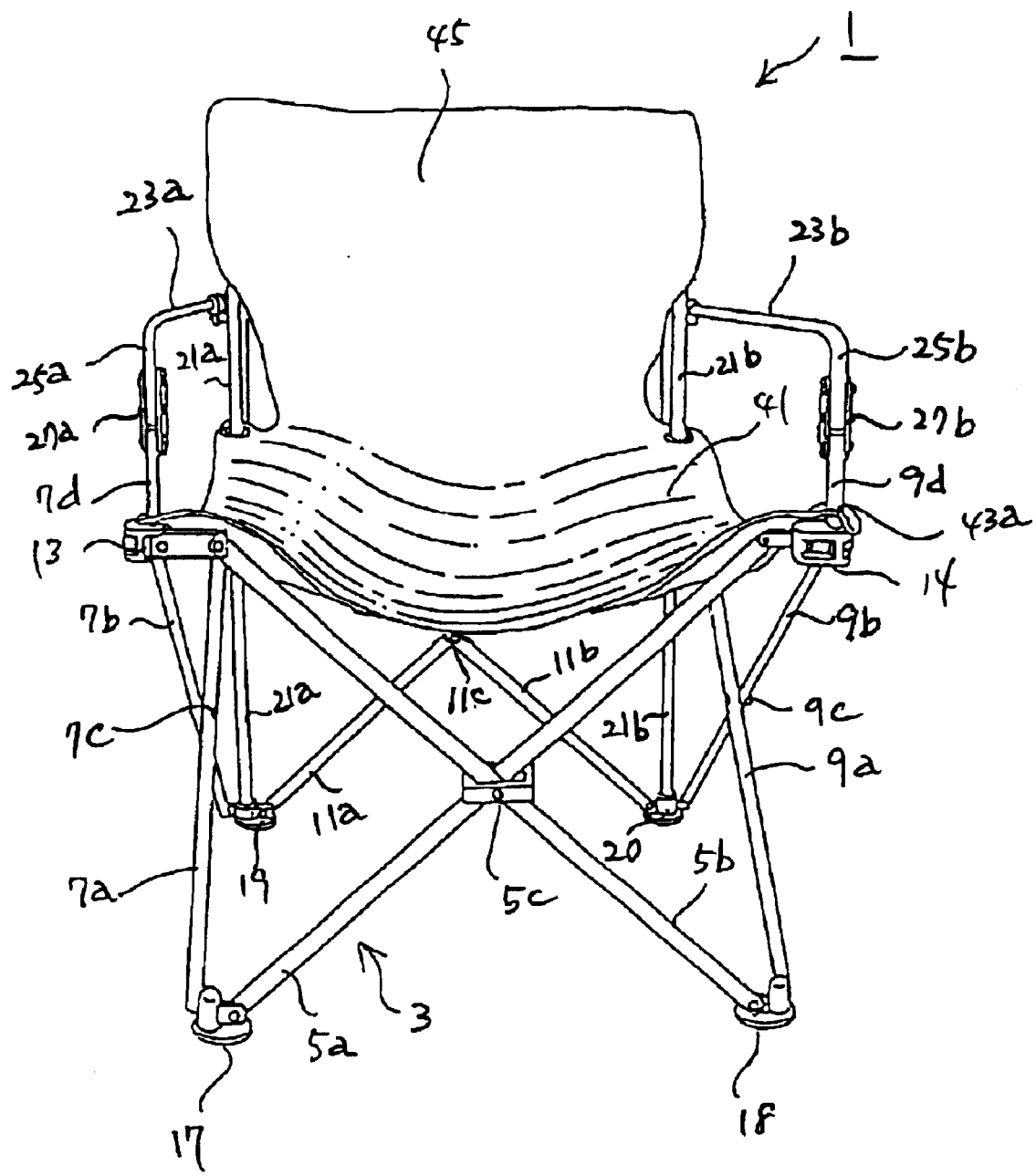
FIG. 2 is a front perspective view of the collapsible chair in its expanded operable position.
Figure 5:
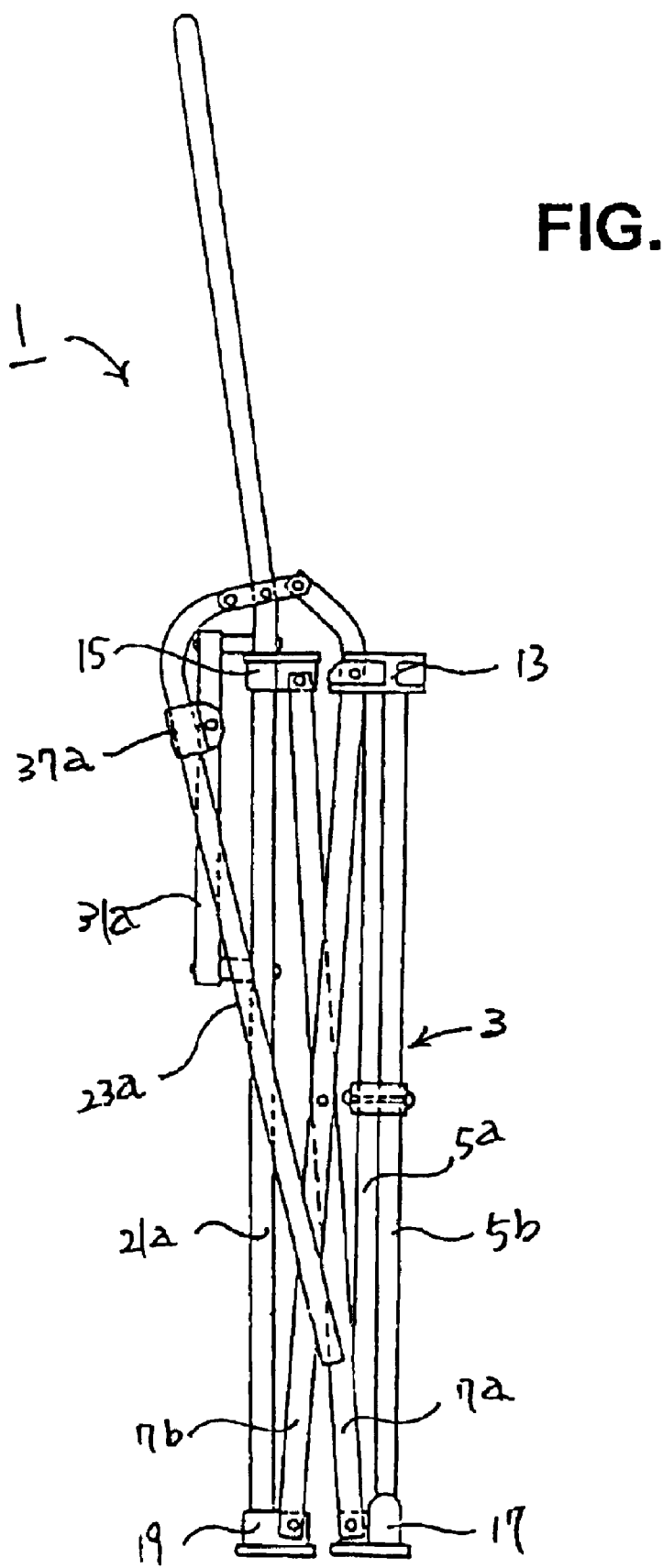
FIG. 5 is a side view of the collapsible chair in its collapsed position, with a combined seat/back rest removed for simplicity.
Figure 6:
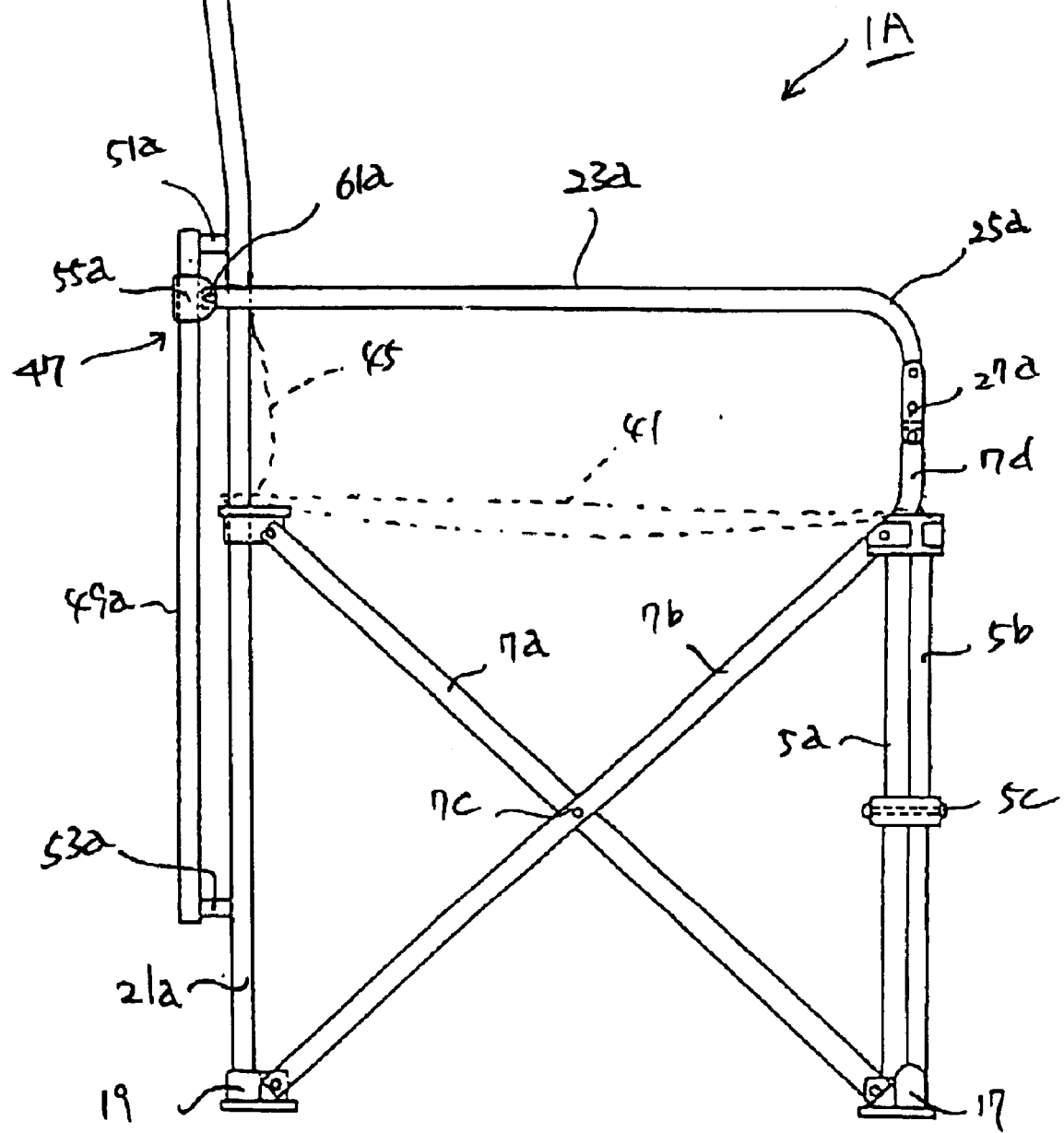
FIG. 6 is a view similar to that of FIG. 1, but showing another embodiment of the collapsible chair shown in FIGS. 1 to 5.
Figure 7:
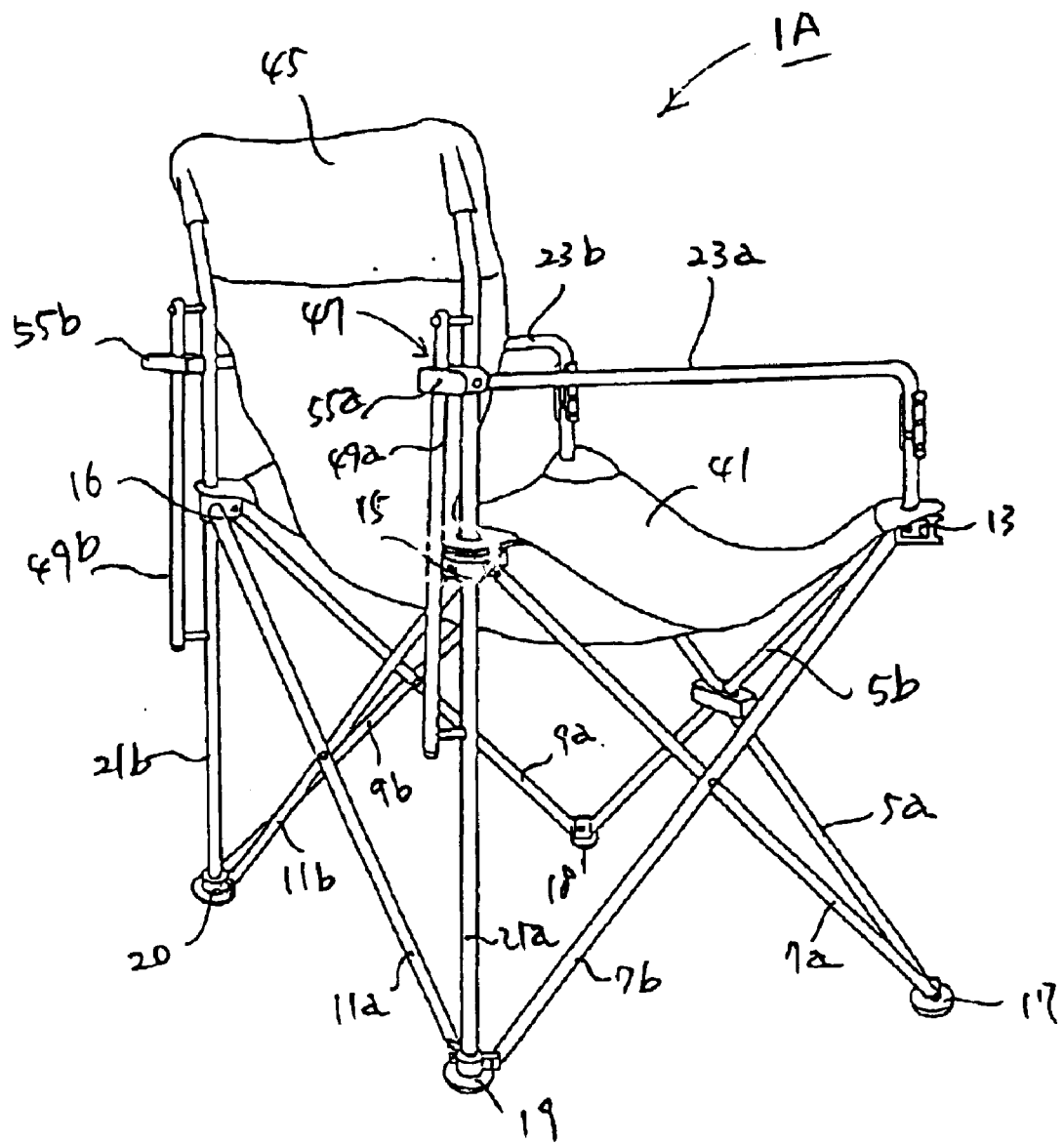
FIG. 7 is a rear perspective view of the collapsible chair shown in FIG. 6.

The frame 3 also includes a parallel pair of vertical back legs 21a, 21b located at opposite sides of the back cross legs 11a, 11b. The lower ends of the vertical back legs 21a, 21b are joined to the lower back connector feet 19, 20, respectively. The vertical back legs 21a, 21b extend upwardly through the upper back connector blocks 15, 16, respectively. The upper back connector blocks 15, 16 are slidably moved along the vertical back legs 21a, 21b when the chair 1 is moved between an expanded operable position as shown in FIGS. 1 and 2 and a collapsed position as shown in FIG. 5.

The chair 1 is provided on its opposite sides with a pair of one-piece rigid arm rests 23a, 23b. The arm rests 23a, 23b are elongated and extend between the front and back sides of the chair 1. The arm rests 23a, 23b may have vertical extensions 25a, 25b although their upper ends are curved from the front ends of the arm rests 23a, 23b. These extensions 25a, 25b serve as hand rests. The left-side cross leg 7b includes an upright extension 7d extending vertically upwardly from the respective upper front connector block 13 although the lower end of the extension 7d is curved from the upper end of the side cross leg 7b. Similarly, the right-side cross leg 9b includes an upright extension 9d extending vertically upwardly from the respective upper front connector block 14 although the lower end of the extension 9d is curved from the upper end of the side cross leg 9b. The upper ends of the extensions 7d, 9d of the side cross legs 7b, 9b are pivotally connected to the lower ends of the hand rests 25a, 25b by pivot pins 27a, 27b.

As best shown in FIG. 3, the rear ends of the arm rests 23a, 23b are pivotably and slidably supported by an arm rest support assembly generally designated by the reference numeral 29. The arm rest support assembly 29 includes a pair of vertical support rods 31a, 31b located behind and extending parallel to the vertical back legs 21a, 21b. The support rods 31a, 31b are attached to the vertical back legs 21a, 21b by a pair of upper pins 33a, 33b and a pair of lower pins 35a, 35b, respectively. These pins limit lengthwise movement of the upper back connector blocks 15, 16 along the respective vertical back legs 21a, 21b. A pair of short sleeves 37a, 37b are pivotably mounted to the respective support rods 31a, 31b by a corresponding pair of pivot pins 39a, 39b to slidably receive the rear ends of the arm rests 23a, 23b. This arrangement allows for slidable and pivotal movement of the arm rests 23a, 23b, as shown by the double-headed arrows in FIG. 3, when the chair 1 is moved between its expanded operable and collapsed positions. A pair of pins or stoppers 40a, 40b extend radially outwardly from the rear ends of the respective arm rests 23a, 23b so as to prevent release of the arm rests 23a, 23b from the sleeves 37a, 37b.

A rectangular seat 41 is mounted on the frame 3 and made of an flexible and preferably, weather-resistant material. The seat 41 is provided with four grommets 43a to 43d, one at each corner of the seat 41, such that the seat 41 can be slipped over the extensions 7d, 9d and the vertical back legs 21a, 21b. The seat 41 rests on the four upper connector blocks 13 to 16 when the chair 1 is in its expanded operable position. The vertical back legs 21a, 21b are longer than the cross legs and provide support for a flexible back rest 45. In this embodiment, the back rest 45 and the seat 41 are integrally made from a single sheet. Alternatively, the back rest may be a discrete sheet.

To fold up the chair 1 from its expanded operable position shown in FIGS. 1 and 2, the arm rests 23a, 23b are upwardly pivoted about the pivot pins 39a, 39b and at the same time, rearwardly slid through the sleeves 37a, 37b. This combined pivotal and sliding movement of the arm rests 23a, 23b causes the upper back connector blocks 15, 16 to be upwardly slid on the vertical back legs 21a, 21b and also, all the cross legs 5a, 5b, 7a, 7b, 9a, 9b, 11a, 11b to be folded in a scissor-like manner. The chair 1 is thus collapsible in two dimensions, simultaneously. The combined seat and back rest 41, 45 are also folded as the front cross legs 5a, 5b and the vertical back legs 21a, 21b are moved toward each other. The chair 1 continues to be collapsed until the arm rests 23a, 23b are moved to its stored position wherein the rear ends of the arm rests 23a, 23b are positioned slightly in front of the vertical back legs 21a, 21b, as shown in FIG. 5. When the chair 1 is folded into a compact package, the legs extend in close, substantially parallel relative positions.

FIGS. 6 to 10 show a collapsible chair assembled according to another embodiment of the present invention and generally designated by the reference numeral 1A. This embodiment differs from the previous embodiment only in that the pivotal sleeve is replaced by a slide block. Thus, like elements are designated by like reference numerals used in the embodiment shown in FIGS. 1 to 5.

Figure 8:
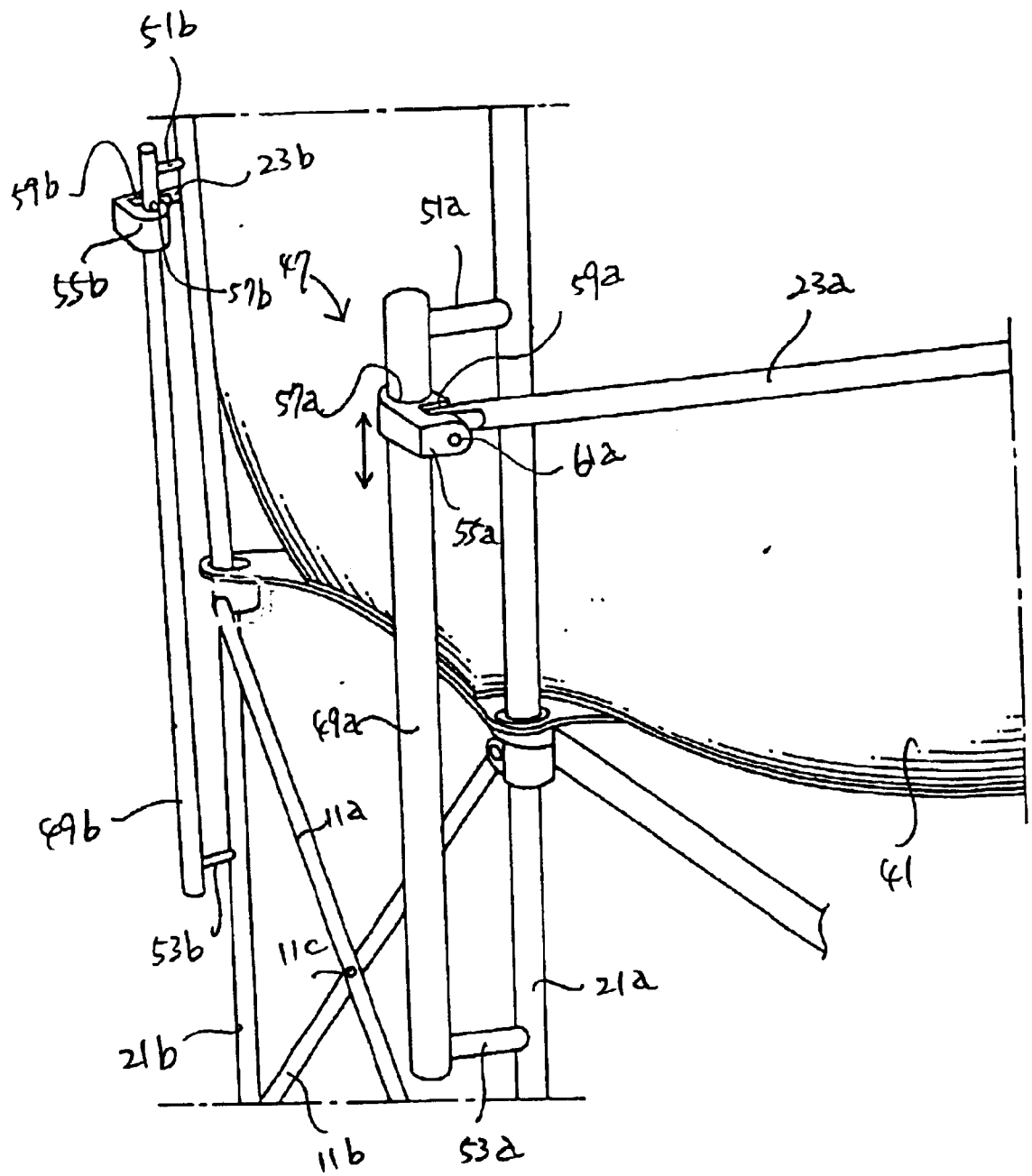
FIG. 8 is an enlarged rear perspective view, in part, of the collapsible chair with a modified form of the arm rest support assembly shown in FIG. 3.
Figure 9:
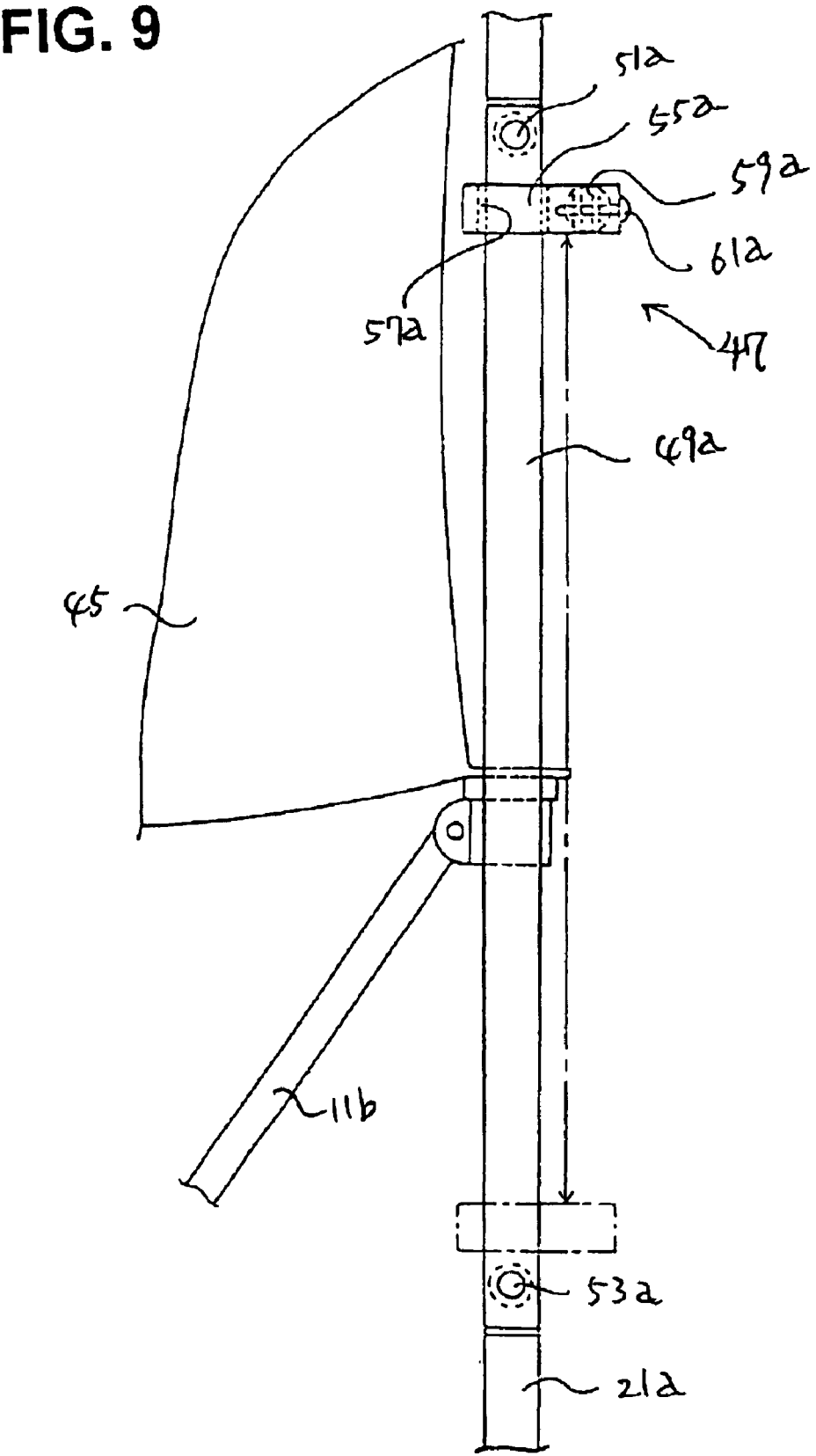
FIG. 9 is an enlarged rear view of the arm rest support assembly shown in FIG. 8.
Figure 10:
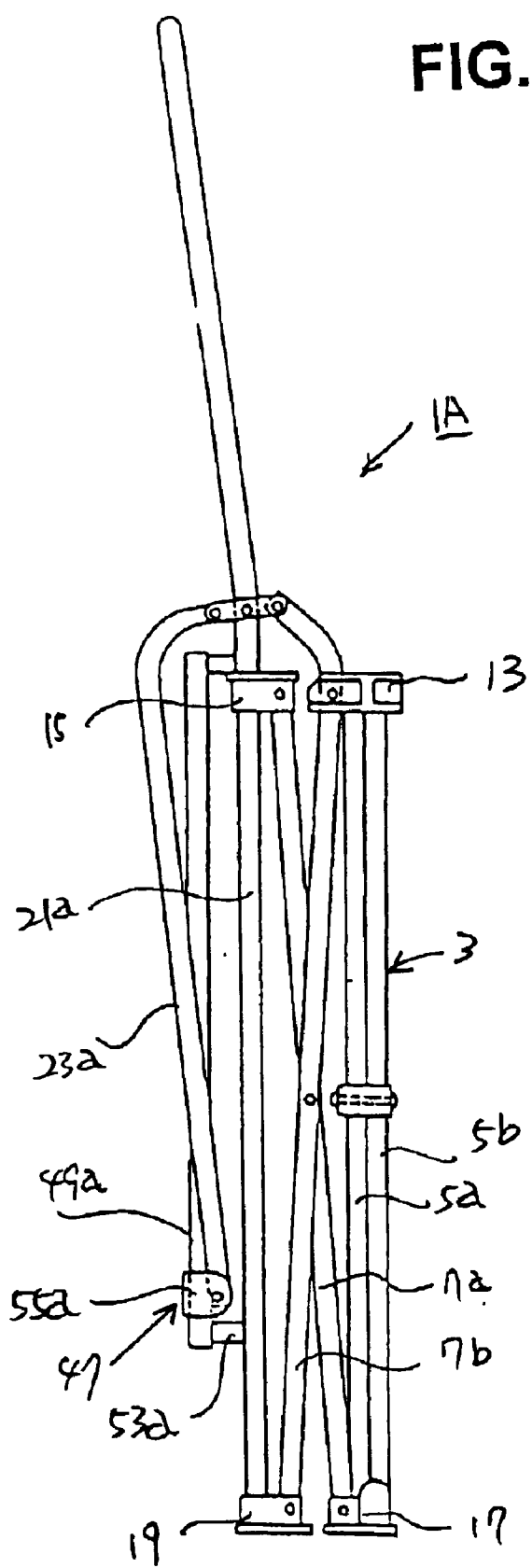
FIG. 10 is a side view of the collapsible chair in its collapsed position.

Referring specifically to FIGS. 8 and 9, the collapsible chair 1A includes an arm rest support assembly, generally designated as at 47, arranged behind the vertical back legs 21a, 21b. The arm rest support assembly 47 includes a pair of support or guide rods 49a, 49b extending parallel to the vertical back legs 21, 21b and attached thereto by a pair of upper pins 51a, 51b and a pair of lower pins 53a, 53b. The guide rods 49a, 49b are longer than the support rods 31a, 31b used in the previous embodiment. A pair of slide blocks 55a, 55b have openings 57a, 57b through which the guide rods 49a, 49b extend. The slide blocks 55a, 55b are free to vertically slide between the pins 51a, 51b, 53a, 53b as shown by the double-headed arrow in FIG. 8. The slide blocks 55a, 55b have slots 59a, 59b to receive the rear ends of the arm rests 23a, 23b. The arm rests 23a, 23b are pivotably connected to the slide blocks 55a, 55b by a corresponding pair of pivot pins 61a, 61b (only one is shown in FIG. 8). With this arrangement, the arm rests 23a, 23b are upwardly pivoted about the pivot pins 61a, 61b and at the same time, downwardly slid on the guide rods 49a, 49b when the arm rests 23a, 23b are pulled up to bring the chair 1A into its collapsed position as shown in FIG. 10. At this time, all the cross legs as well as the vertical back legs are moved in the same manner as in the previous embodiment.

Figure 11:
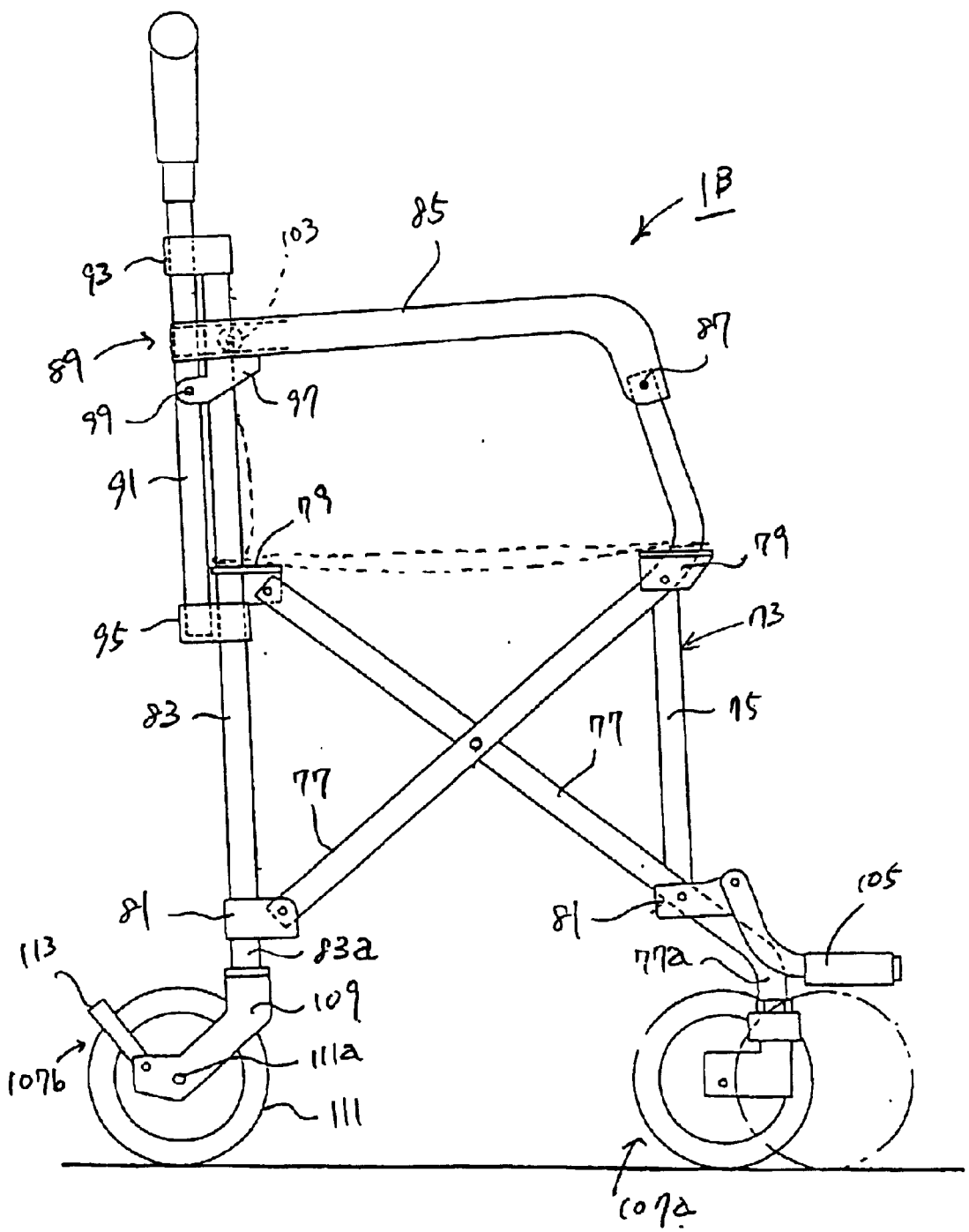
FIG. 11 is a side view of a collapsible wheelchair according to a further embodiment of the present invention.
Figure 12:
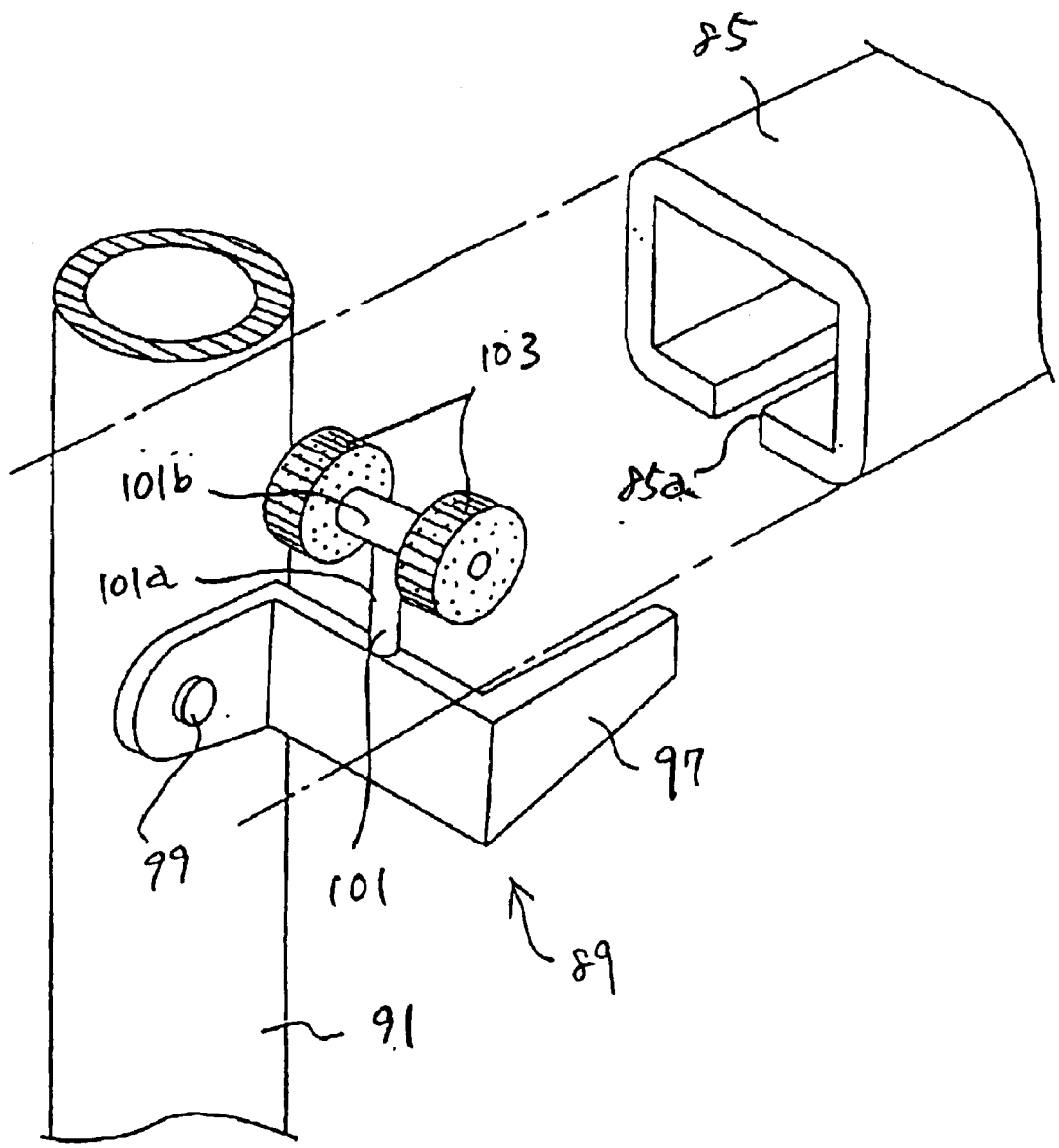
FIG. 12 is an enlarged rear perspective view of a modified form of the arm rest support assembly shown in FIG. 3.
Figure 13:
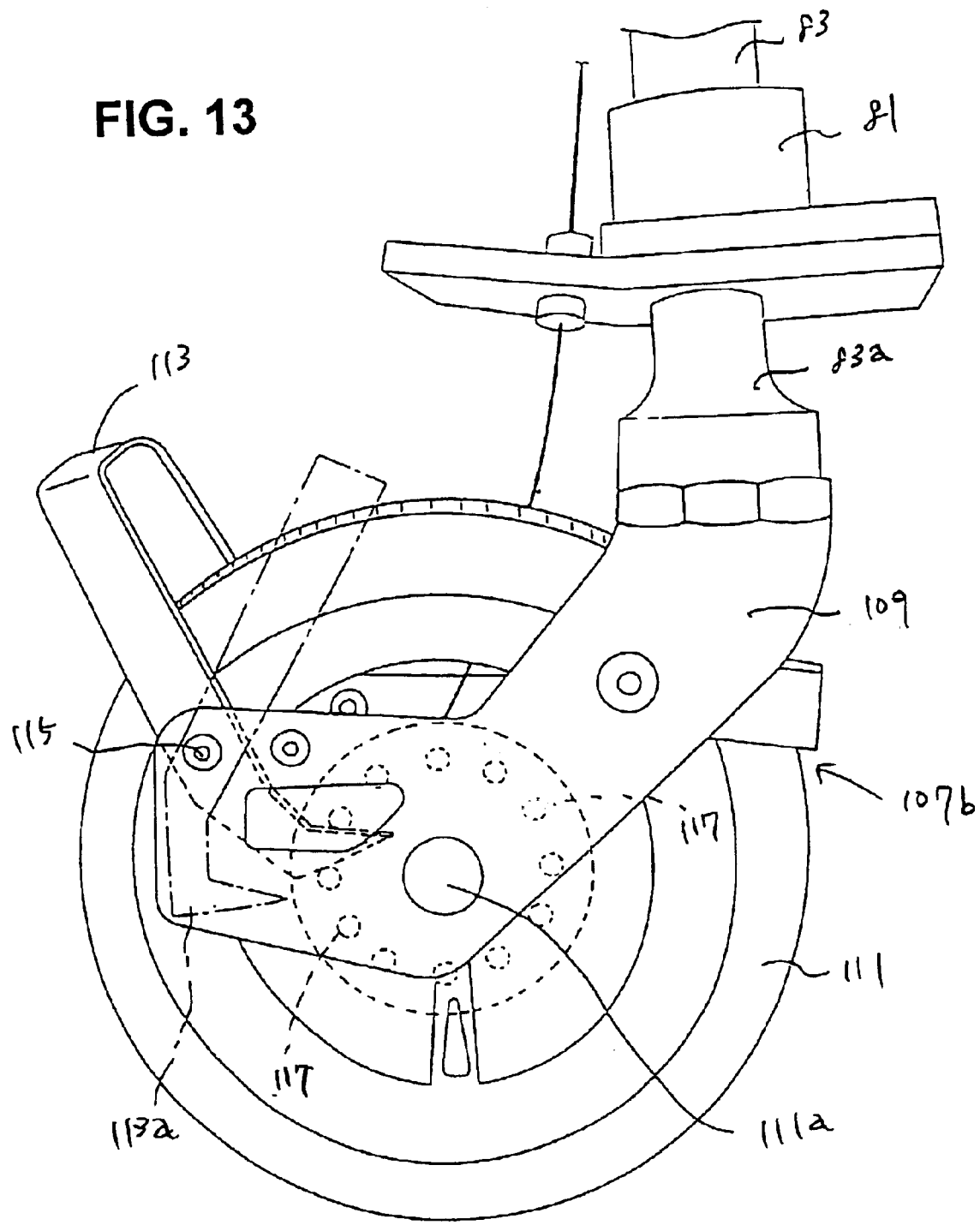
FIG. 13 is a side view, on an enlarged scale, of a rear caster used in the collapsible wheelchair shown in FIG. 11.

Referring to FIGS. 11 to 13, there is illustrated a collapsible wheelchair assembled according to a further embodiment of the present invention and generally designated by the reference numeral 1B. The framework of the collapsible chair 1B is similar to the frame 3 of the chair 1 and therefore, will briefly be explained. The collapsible wheelchair 1B includes a frame 73 composed of a front pair of cross legs 75 (only one is shown in FIG. 11), two pairs of side cross legs 77 (only the left-side cross legs are shown in FIG. 11), and a pair of back cross legs (not shown). All the cross legs are pivotably connected where they cross. The upper and lower ends of the cross legs are pivotably connected together by a set of four upper connector blocks 79 (only two are shown in FIG. 11), one at each corner of the chair, and a set of four lower connector blocks 81 (only two are shown in FIG. 11), one at each corner of the chair 1B. A pair of vertical back legs 83 (only one is shown in FIG. 11) extend through the upper and lower back connector blocks 79, 81. A pair of arm rests 85 are located on opposite sides of the wheelchair 1B. The arm rests 85 have bent front ends pivotally connected as at 87 to the bent upper ends of the side cross legs 77 and rear ends supported by an arm rest support assembly 89.

The arm rest support assembly 89 includes a pair of vertical support rods 91 (only one is shown in FIG. 11) with their upper and lower ends fixed to the vertical back legs 83 by two pairs of upper and lower connecting members 93, 95. As best shown in FIG. 12, a generally Z-shaped bracket 97 is pivotably connected to the respective support rod 91 by a pivot pin 99. A T-shaped mount 101 has an upright portion 101a fixed at its lower end to the top of the bracket 97, and a horizontal portion 101b connected to the upper end of the upright portion 101a. A pair of rollers 103 are rotatably mounted to opposite ends of the horizontal portion 101b of the mount 101. Each of the hollow arm rests 85 has a rectangular cross section. The arm rest 85 is formed at its bottom with a longitudinal slit 85a to slidably receive the upright portion 101a of the mount 101. The rollers 103 are rollingly received in the bottom of the arm rest 85. With this arrangement, the arm rests 85 are upwardly pivoted about the pivot pins 99 and at the same time, rearwardly slid when the wheelchair 1B is folded to its collapsed position. The reference numeral 105 designates a pair of foot rests (only one is shown in FIG. 11) pivotably connected to the lower front connector blocks 81, respectively.

In the illustrated embodiment, the collapsible wheelchair 1B is provided with a front pair of casters 107a and a rear pair of casters 107b (only one of each pair is shown in FIG. 11). To this end, the vertical back legs 83 have extensions 83a (only one is shown in FIG. 11) at their lower ends, and the forwardly and downwardly inclined side cross legs 77 have extensions 77a (only one is shown in FIG. 11) at their lower ends. The extensions 77a are connected to the front casters 107a, and the extensions 83a are connected to the back casters 107b. As best shown in FIG. 13, each of the rear casters 107b includes a fork 109, and a wheel 111 rotatably supported by the fork 109. An inverted U-shaped lever 113 is pivotably connected as at 115 to the fork 109 so as to selectively stop the wheel 111. For ready operation of the lever 113, the wheel 111 has an axle 111a displaced rearwardly of the axis of the respective vertical back leg 83. The lever 113 has a pair of hook-shaped ends 113a. A plurality of stud pins 117 extend axially from opposite sides of the wheel 111 and are arranged in a circumferentially equally spaced relationship. The hook-shaped ends 113a of the lever 113 are engaged with a selected pair of the stud pins 117 as shown by solid line in FIG. 13. When the lever 113 is rotated in a forward direction, the hook-shaped ends 113a of the lever 113 are disengaged from the stud pins 117 as shown by phantom line in FIG. 13.

Figure 14:
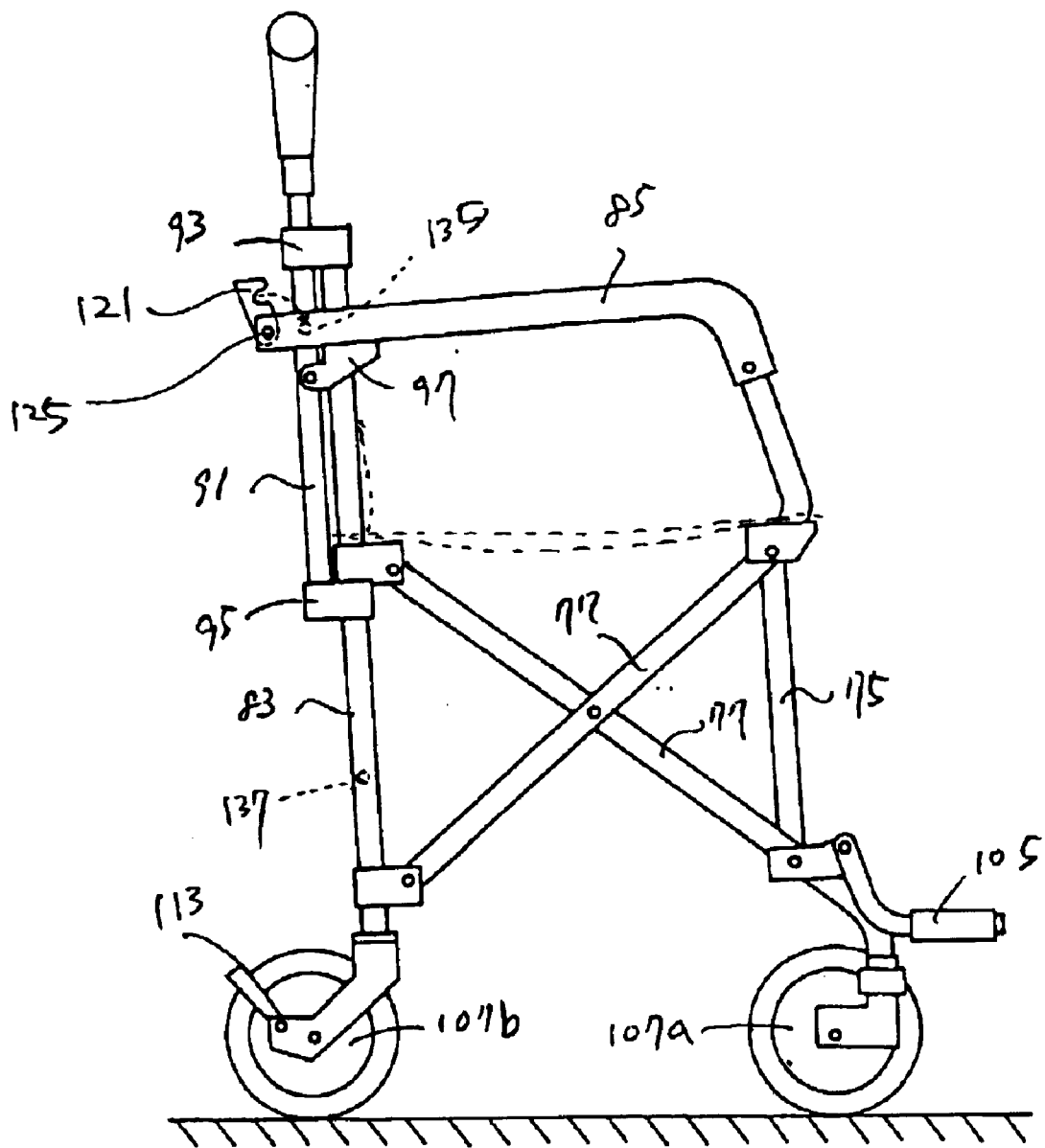
FIG. 14 is a view similar to that of FIG. 11, but showing the use of locking means.
Figure 15:
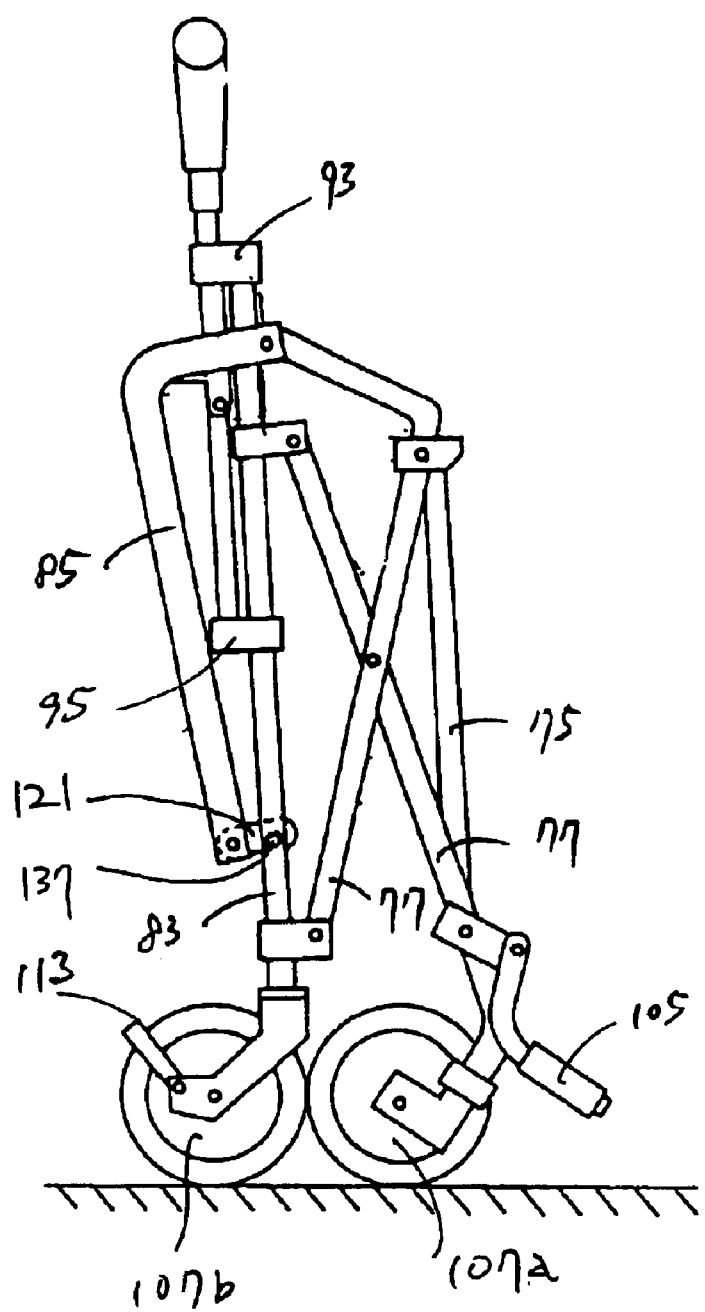
FIG. 15 is a side view of the collapsible wheelchair wherein locking means acts to prevent inadvertent unfolding of the wheelchair.
Figure 16:
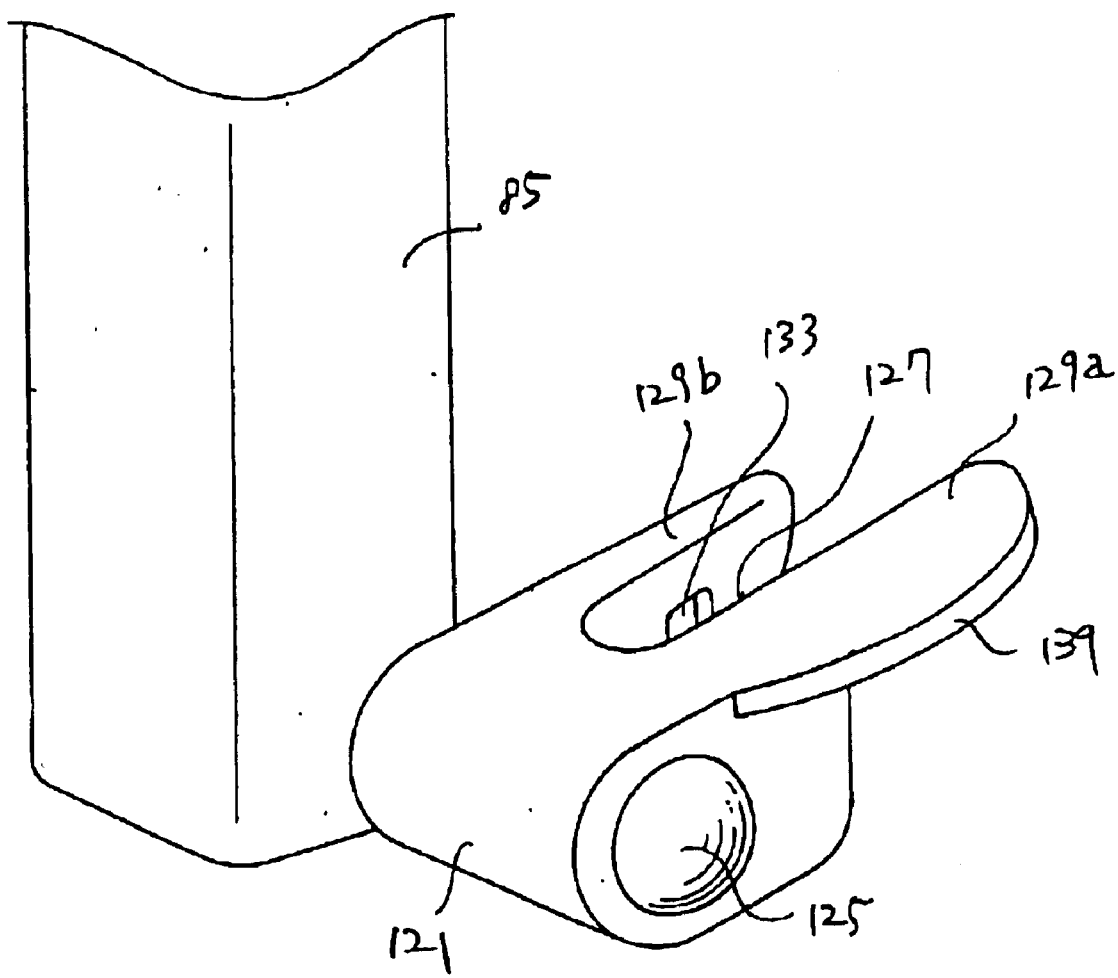
FIG. 16 is an enlarged perspective view of a hook as part of locking means.
Figure 17:
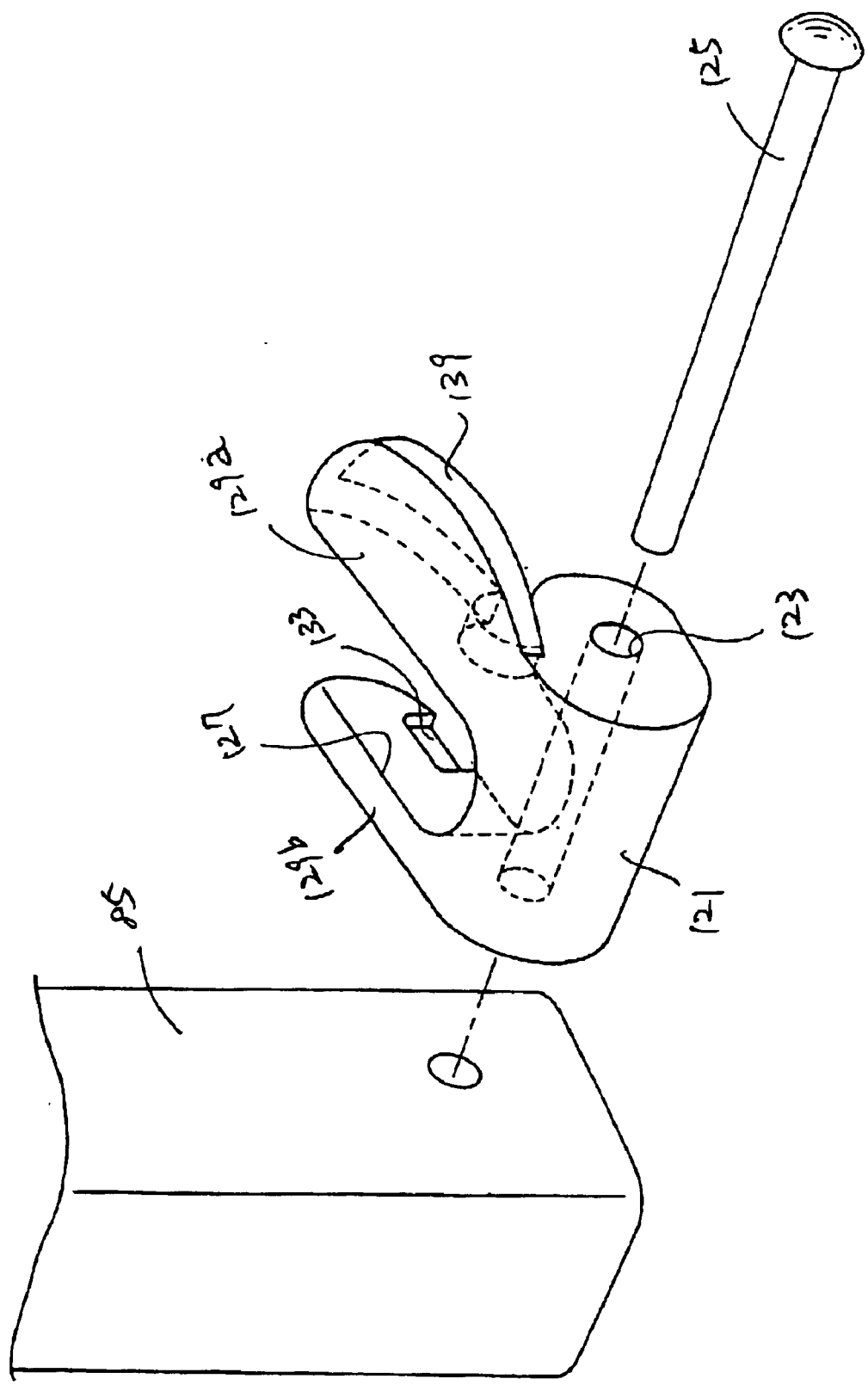
FIG. 17 is an exploded perspective view showing the manner in which the hook is rotatably mounted to the arm rest.
Figure 18:
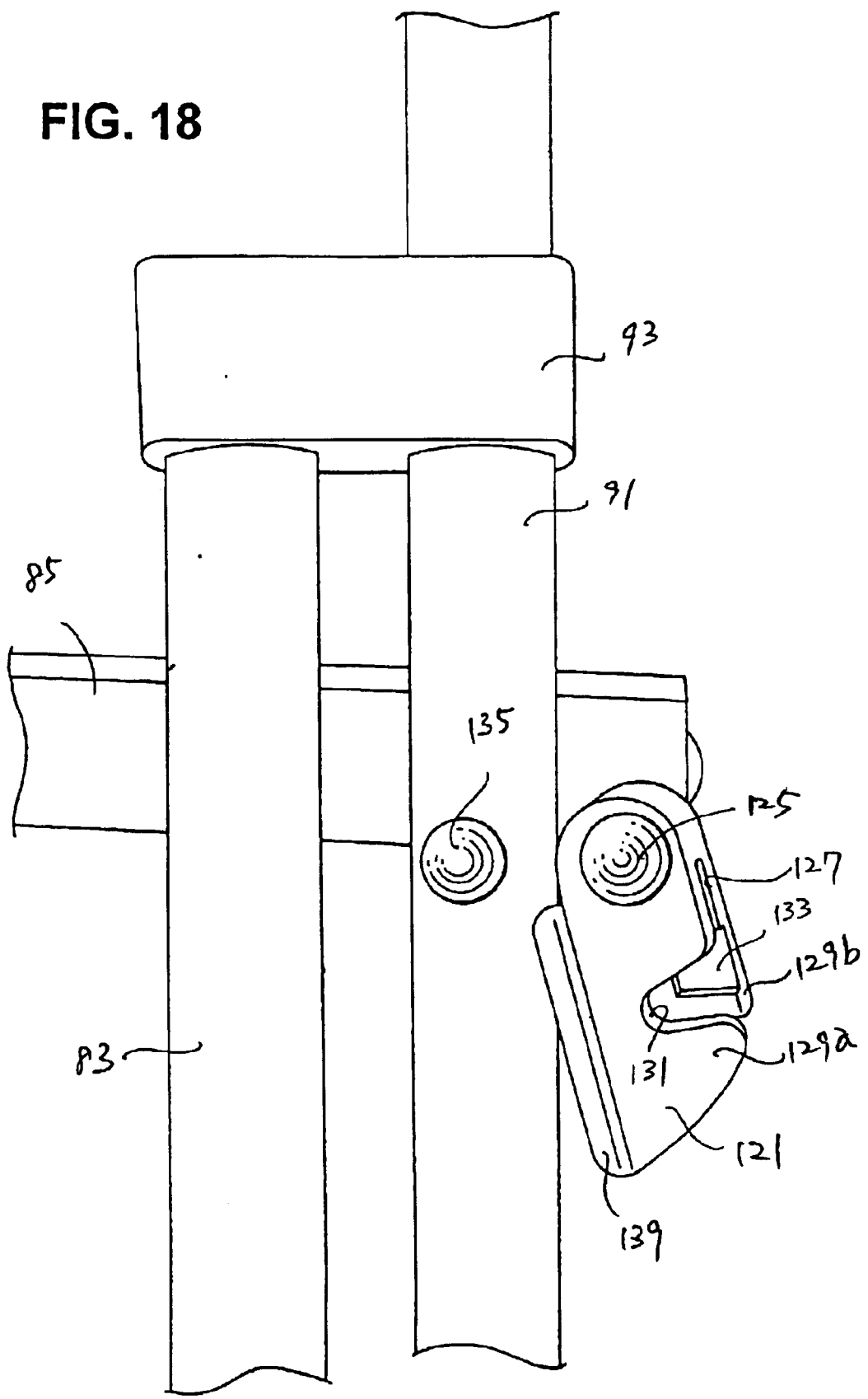
FIG. 18 is an enlarged view of the hook before it is engaged with an upper locking pin.

As shown in FIGS. 14 and 15, locking means may be provided to prevent inadvertent folding of the collapsible wheelchair while the wheelchair is in its expanded operable position (FIG. 14) and inadvertent unfolding of the wheelchair while the wheelchair is in its collapsed position (FIG.

Figure 19:
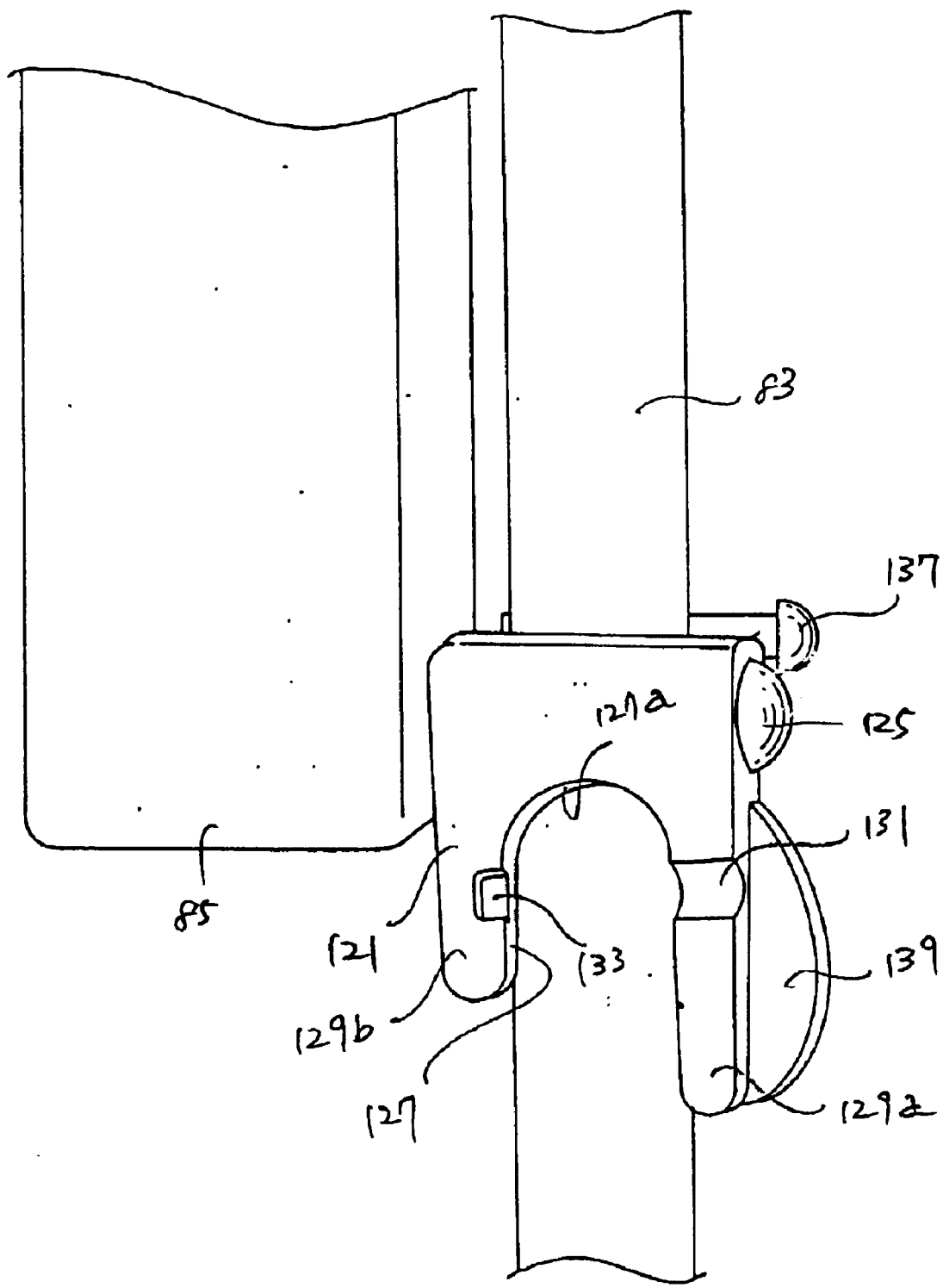
FIG. 19 is an enlarged view of the hook before the hook is engaged with a lower locking pin.
Figure 20:
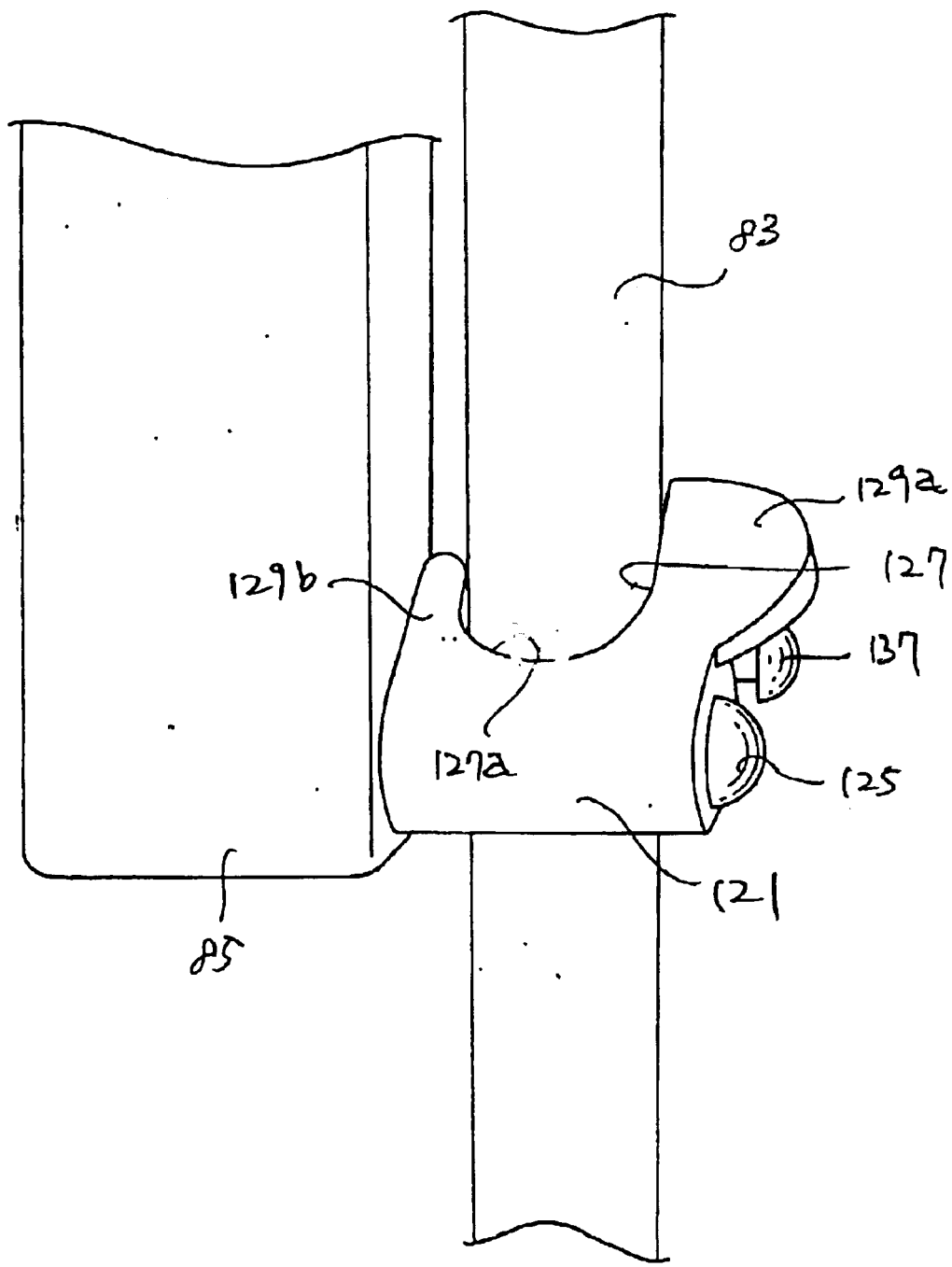
FIG. 20 is an enlarged view of the hook when the hook has been engaged with the lower locking pin.

15). Referring to FIGS. 16 to 20, locking means includes a pair of generally U-shaped hooks 121 with respective through holes 123. A corresponding pair of mounting pins 125 extend through the holes 123 to rotatably mount the hooks 121 to the rear ends of the arm rests 85. Each of the hooks 121 has a recess 127 to form a pair of opposite arms 129a, 129b. One of the arms 129a is longer than the other arm 129b. A semicircular groove 131 is formed in the bottom of the long arm 129a. A rectangular notch 133 is formed in the bottom of the short arm 129b and aligned with the groove 131. The recess 127 of each of the hooks 121 has a rounded bottom 127a. Locking means further includes a pair of upper locking pins 135 (only one is shown) attached to the inner side of the support rods 91 (FIG. 18), and a pair of lower locking pins 137 (only one is shown) attached to the inner side of the vertical back legs 83 (FIGS. 19 and 20). With the wheelchair in its expanded operable position as shown in FIG. 14, the hooks are forwardly rotated about the pins 125 (counterclockwise direction in FIG. 18). This rotation is stopped when the locking pins 135 are received in the grooves 131 and the notches 133 of the hooks 121. At this time, the support rods 91 are closely fitted in the rounded bottom 127a of the recesses 127 of the hooks 121. This engagement of the hooks 121 of the locking pins 135 prevents pivotal movement of the arm rests 85 and thus, inadvertent folding of the wheelchair. With the wheelchair in its collapsed position as shown in FIG. 15, the hooks 121 are upwardly rotated about the pins 121. This rotation is stopped when the locking pins 137 are received in the grooves 131 and notches 133 of the hooks 121. At this time, the vertical back legs 83 are closely fitted in the rounded bottom 127a of the recesses 127 of the hooks 121. This engagement of the hooks 121 with the locking pins 137 prevents pivotal movement of the arm rests 85 and thus, inadvertent unfolding of the wheelchair. As shown in FIGS. 19 and 20, the hooks 121 have tabs 139 extending outwardly and sidewardly from the long arms 129a. These tabs 139 facilitate engagement and disengagement of the hooks 121 from the locking pins.

Figure 21:
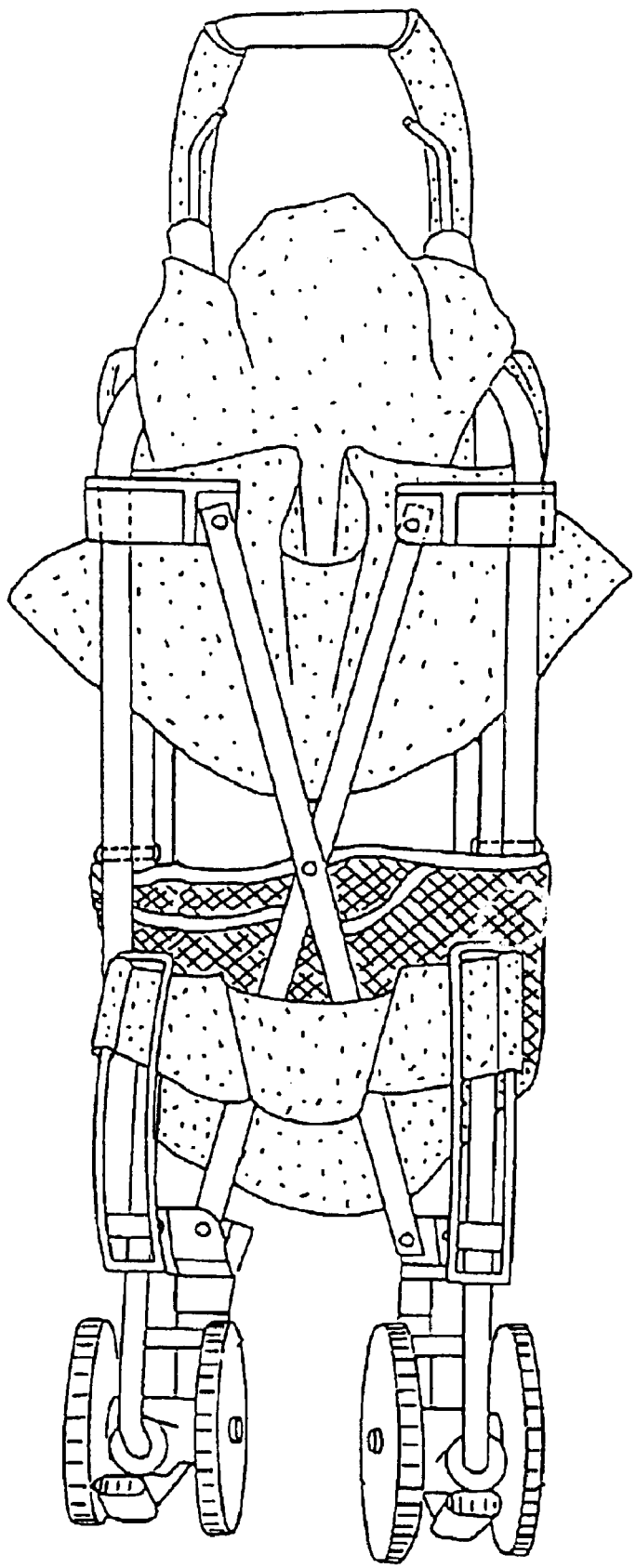
FIG. 21 is a front view of a baby carriage.
Figure 22:
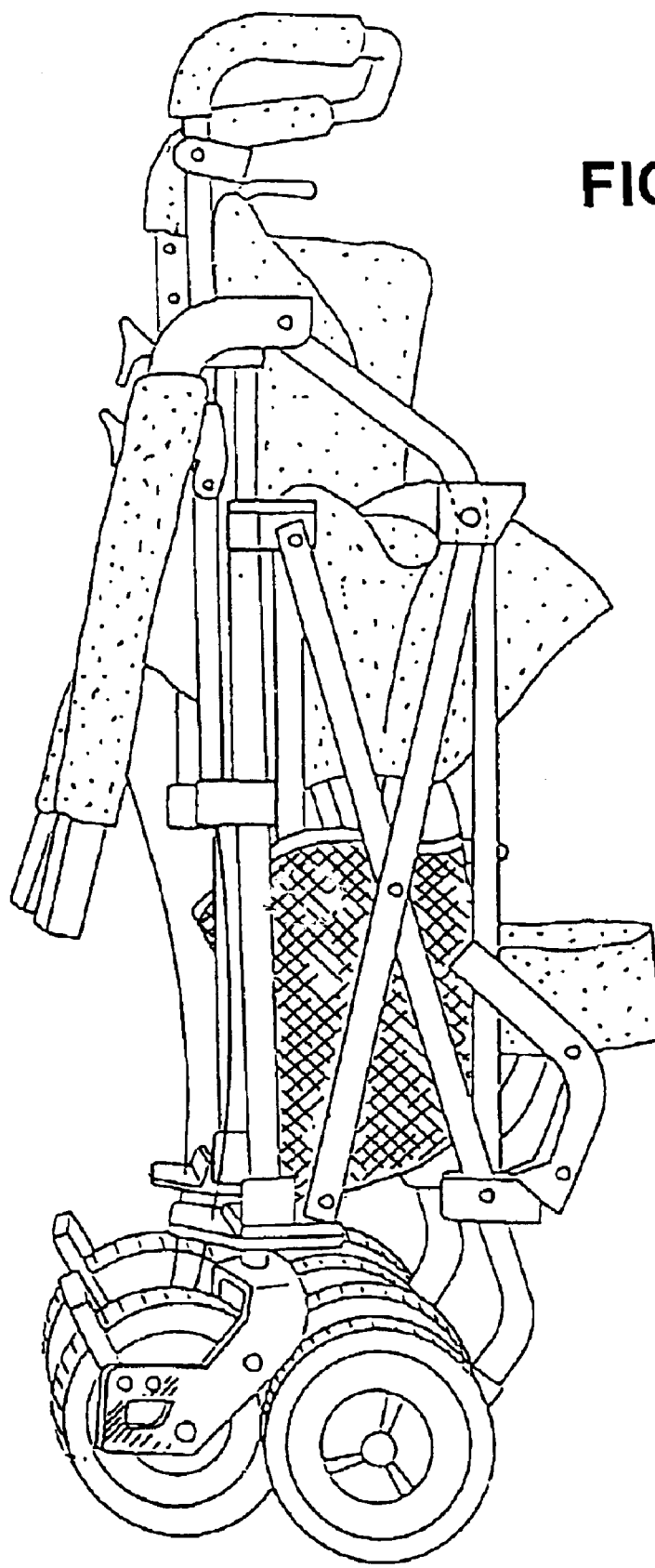
FIG. 22 is a side view of the baby carriage shown in FIG. 21.

Although the present invention has been described with respect to its preferred embodiments, it is to be understood that various modifications and changes may be made without departing from the scope of the invention. For example, the present invention may be applied to baby carriages as shown in FIGS. 21 and 22. In such a case, each front caster may preferably include a pair of opposite wheels, and each back caster may includes a single wheel. The wheel of each of the back casters may be positioned between the opposite wheels of each of the front casters when the baby carriage is folded up.

What is claimed is:

1. A collapsible chair comprising:
    a frame including a pair of front cross legs pivotally connected together intermediate their length, a pair of back cross legs pivotally connected together intermediate their length, two pairs of side cross legs pivotally connected together intermediate their length, a pair of vertical back legs located at opposite sides of the back cross legs, and means for interconnecting the front cross legs, the back cross legs, the side cross legs and the vertical back legs so as to move the collapsible chair between an expanded operable position and a collapsed position, said means for interconnecting including a pair of upper front pivot connections for pivotally connecting upper ends of the front cross legs and adjacent upper ends of the side cross legs, a pair of upper back pivot connections slidably mounted on the vertical back legs and adapted to pivotally connect upper ends of the back cross legs and adjacent upper ends of the side cross legs, a pair of lower front pivot connections for pivotally connecting lower ends of the front cross legs and adjacent lower ends of the side cross legs, and a pair of lower back pivot connections mounted on the vertical back legs and adapted to pivotally connect lower ends of the back cross legs and adjacent lower ends of the side cross legs;
    a flexible seat connected to the frame;
    a pair of rigid arm rests located on opposite sides of the collapsible chair and having front and rear ends, said front ends of the arm rests being connected to said frame; and
    means connected to the vertical back legs for moving the arm rests between a substantially horizontal operative position when the collapsible chair is held in its expanded operable position and a substantially vertical stored position when the collapsible chair is held in its collapsed position,
    wherein said means for moving the arm rests comprises a pair of support rods connected to and extending substantially parallel to the vertical back legs, and a corresponding pair of sleeves pivotally connected to the support rods and adapted to slidably receive said arm rests.

2. A collapsible chair according to claim 1, wherein said frame has upwardly extending extensions pivotably connected to said front ends of said arm rests.

3. A collapsible chair according to claim 1, wherein said means for moving the arm rests further comprises a pair of upper connecting members and a pair of lower connecting members for joining said pair of support rode to said pair of vertical back legs, said pair of upper and lower connecting members being positioned to limit vertical movement of the upper back pivot connections along said vertical back legs.

4. A collapsible chair according to claim 1, further comprising locking means for locking said arm rests against pivotal movement when the collapsible chair is held in its expanded operable and collapsed positions, said locking means including a pair of first locking members pivotably connected to said rear ends of said arm rests, a pair of second locking members attached to said support rods, and a pair of third locking members attached to said vertical back legs, said first locking members being lockingly engageable with said second and third locking members when said collapsible chair is held in the expanded operable position and the collapsed position, respectively.

5. A collapsible chair comprising:
    a frame including a pair of front cross legs pivotally connected together intermediate their length, a pair of back cross legs pivotally connected together intermediate their length, two pairs of side cross legs pivotally connected together intermediate their length, a pair of vertical back legs located at opposite sides of the back cross legs, and means for interconnecting the front cross legs, the back cross legs, the side cross legs and the vertical back legs so as to move the collapsible chair between an expanded operable position and a collapsed position, said means for interconnecting including a pair of upper front pivot connections for pivotally connecting upper ends of the front cross legs and adjacent upper ends of the side cross legs, a pair of upper back pivot connections slidably mounted on the vertical back legs and adapted to pivotally connect upper ends of the back cross legs and adjacent upper ends of the side cross legs, a pair of lower front pivot connections for pivotally connecting lower ends of the front cross legs and adjacent lower ends of the side cross legs, and a pair of lower back pivot connections mounted on the vertical back legs and adapted to pivotally connect lower ends of the back cross legs and adjacent lower ends of the side cross legs;

a flexible seat connected to the frame;

a pair of rigid arm rests located on opposite sides of the collapsible chair and having front and rear ends, said front ends of the arm rests being connected to said frame; and means connected to the vertical back legs for moving the arm rests between a substantially horizontal operative position when the collapsible chair is held in its expanded operable position and a substantially vertical stored position when the collapsible chair is held in its collapsed position, wherein said means for moving the arm rests comprises a pair of guide rods connected to and extending substantially parallel to the vertical back legs, and a corresponding pair of slide blocks slidably mounted on said guide rods, said rear ends of said arm rests being pivotably connected to said slide blocks.

6. A collapsible chair according to claim 5, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections.

7. A collapsible chair according to claim 6, wherein said rear pair of casters comprises a corresponding pair of wheels, and a corresponding pair of pivotal levers operatively associated with said wheels to selectively stop said wheels.

8. A collapsible chair according to claim 7, wherein said pair of wheels have a corresponding pair of axles displaced rearwardly of said vertical back legs, and said pivotal levers are positioned rearwardly of the axles.

9. A collapsible chair according to claim 5, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections, each of said front pair of casters including a pair of spaced wheels, and each of said rear pair of casters including a single wheel positionable between said pair of spaced front wheels when the collapsible chair is folded to its collapsed position.

10. A collapsible chair according to claim 5, wherein each of said pair of arm rests is a one-piece structure.

11. A collapsible chair according to claim 5, further comprising a flexible back rest extending between said vertical back legs.

12. A collapsible chair according to claim 5, wherein said frame has upwardly extending extensions pivotably connected to said front ends of said arm rests.

13. A collapsible chair according to claim 5, wherein said means for moving the arm rests further comprises a pair of upper connecting members and a pair of lower connecting members for joining said guide rods to said vertical back legs, said pair of upper and lower connecting members being positioned to limit vertical movement of the upper back pivot connections along said vertical back legs.

14. A collapsible chair according to claim 5, further comprising locking means for locking said arm rests against pivotal movement when the collapsible chair is held in its expanded operable and collapsed positions, said locking means including a pair of first locking members pivotably connected to said rear ends of said arm rests, a pair of second locking members attached to said guide rods, and a pair of third locking members attached to said vertical back legs, said first locking members being lockingly engageable with said second and third locking members when said collapsible chair is held in the expanded operable position and the collapsed position, respectively.

15. A collapsible chair comprising:

a frame including a pair of front cross legs pivotally connected together intermediate their length, a pair of back cross legs pivotally connected together intermediate their length, two pairs of side cross legs pivotally connected together intermediate their length, a pair of vertical back legs located at opposite sides of the back cross legs, and means for interconnecting the front cross legs, the back cross legs, the side cross legs and the vertical back legs so as to move the collapsible chair between an expanded operable position and a collapsed position, said means for interconnecting including a pair of upper front pivot connections for pivotally connecting upper ends of the front cross legs and adjacent upper ends of the side cross legs, a pair of upper back pivot connections slidably mounted on the vertical back legs and adapted to pivotally connect upper ends of the back cross legs and adjacent upper ends of the side cross legs, a pair of lower front pivot connections for pivotally connecting lower ends of the front cross legs and adjacent lower ends of the side cross legs, and a pair of lower back pivot connections mounted on the vertical back legs and adapted to pivotally connect lower ends of the back cross legs and adjacent lower ends of the side cross legs;

a flexible seat connected to the frame;

a pair of rigid arm rests located on opposite sides of the collapsible chair and having front and rear ends, said front ends of the arm rests being connected to said frame; and means connected to the vertical back legs for moving the arm rests between a substantially horizontal operative position when the collapsible chair is held in its expanded operable position and a substantially vertical stored position when the collapsible chair is held in its collapsed position, wherein said means for moving the arm rests comprises a pair of support rods connected to and extending substantially parallel to the vertical back legs, a corresponding pair of brackets pivotably connected to said support rods, and rollers rotatably carried by said brackets and rollingly received within said arm rests.

16. A collapsible chair according to claim 15, wherein said frame has upwardly extending extensions pivotably connected to said front ends of said arm rests.

17. A collapsible chair according to claim 15, wherein said means for moving the arm rests further comprises a pair of upper connecting members and a pair of lower connecting members for joining said support rods to said vertical back legs, said pair of upper and lower connecting members being positioned to limit vertical movement of the upper back pivot connections along said vertical back legs.

18. A collapsible chair according to claim 15, further comprising locking means for locking said arm rests against pivotal movement when the collapsible chair is held in its expanded operable and collapsed positions, said locking means including a pair of first locking members pivotably connected to said rear ends of said arm rests, a pair of second locking members attached to said support rods, and a pair of third locking members attached to said vertical back legs, said first locking members being lockingly engageable with said second and third locking members when said collapsible chair is held in the expanded operable position and the collapsed position, respectively.

19. A collapsible chair according to claim 18, wherein said first locking members are in the form of hooks, and said second and third locking members are in the form of pins.

20. A collapsible chair according to claim 15, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections.

21. A collapsible chair according to claim 20, wherein said rear pair of casters comprises a corresponding pair of wheels, and a corresponding pair of pivotal levers operatively associated with said wheels to selectively stop said wheels.

22. A collapsible chair according to claim 21, wherein said pair of wheels have a corresponding pair of axles displaced rearwardly of said vertical back legs, and said pivotal levers are positioned rearwardly of the axles.

23. A collapsible chair according to claim 15, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections, each of said front pair of casters including a pair of spaced wheels, and each of said rear pair of casters including a single wheel positionable between said pair of spaced front wheels when the collapsible chair is folded to its collapsed position.

24. A collapsible chair according to claim 15, wherein each of said pair of arm rests is a one-piece structure.

25. A collapsible chair according to claim 15, further comprising a flexible back rest extending between said vertical back legs.

26. A collapsible chair according to claim 1, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections.

27. A collapsible chair according to claim 26, wherein said rear pair of casters comprises a corresponding pair of wheels, and a corresponding pair of pivotal levers operatively associated with said wheels to selectively stop said wheels.

28. A collapsible chair according to claim 27, wherein said pair of wheels have a corresponding pair of axles displaced rearwardly of said vertical back legs, and said pivotal levers are positioned rearwardly of the axles.

29. A collapsible chair according to claim 1, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections, each of said front pair of casters including a pair of spaced wheels, and each of said rear pair of casters including a single wheel positionable between said pair of spaced front wheels when the collapsible chair is folded to its collapsed position.

30. A collapsible chair according to claim 1, wherein each of said pair of arm rests is a one-piece structure.

31. A collapsible chair according to claim 1, further comprising a flexible back rest extending between said vertical back legs.

32. A collapsible chair comprising:
   a frame including a pair of front cross legs pivotally connected together intermediate their length, a pair of back cross legs pivotally connected together intermediate their length, two pairs of side cross legs pivotally connected together intermediate their length, a pair of vertical back legs located at opposite sides of the back cross legs, and means for interconnecting the front cross legs, the back cross legs, the side cross legs and the vertical back legs so as to move the collapsible chair between an expanded operable position and a collapsed position, said means for interconnecting including a pair of upper front pivot connections for pivotally connecting upper ends of the front cross legs and adjacent upper ends of the side cross legs, a pair of upper back pivot connections slidably mounted on the vertical back legs and adapted to pivotally connect upper ends of the back cross legs and adjacent upper ends of the side cross legs, a pair of lower front pivot connections for pivotally connecting lower ends of the front cross legs and adjacent lower ends of the side cross legs, and a pair of lower back pivot connections mounted on the vertical back legs and adapted to pivotally connect lower ends of the back cross legs and adjacent lower ends of the side cross legs;
   a flexible seat connected to the frame;
   a pair of rigid arm rests located on opposite sides of the collapsible chair and having front and rear ends, said front ends of the arm rests being connected to said frame; and
   a pair of support rods connected to and extending substantially parallel to the vertical back legs, and a corresponding pair of sliding elements pivotably connected to the support rods and adapted to be slidably connected to said arm rests, wherein the support rods and the sliding elements allow movement of the arm rests between a substantially horizontal operative position when the collapsible chair is held in its expanded operable position and a substantially vertical stored position when the collapsible chair is held in its collapsed position.

33. A collapsible chair according to claim 32, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections.

34. A collapsible chair according to claim 33, wherein said rear pair of casters comprises a corresponding pair of wheels, and a corresponding pair of pivotal levers operatively associated with said wheels to selectively stop said wheels.

35. A collapsible chair according to claim 34, wherein said pair of wheels have a corresponding pair of axles displaced rearwardly of said vertical back legs, and said pivotal levers are positioned rearwardly of the axles.

36. A collapsible chair according to claim 32, further comprising means for moving the collapsible chair, said means for moving the collapsible chair including a front pair of casters rotatably supported by said frame and located below said lower front pivot connections, and a rear pair of casters rotatably supported by said frame and located below said lower back pivot connections, each of said front pair of casters including a pair of spaced wheels, and each of said rear pair of casters including a single wheel positionable between said pair of spaced front wheels when the collapsible chair is folded to its collapsed position.

37. A collapsible chair according to claim 32, wherein each of said pair of arm rests is a one-piece structure.

38. A collapsible chair according to claim 32, further comprising a flexible back rest extending between said vertical back legs.

* * * * *